(12) United States Patent
Rothschild et al.

(10) Patent No.: US 8,527,345 B2
(45) Date of Patent: Sep. 3, 2013

(54) SYSTEM AND METHOD FOR ADDING AN ADVERTISEMENT TO A PERSONAL COMMUNICATION

(76) Inventors: Anthony Richard Rothschild, London (GB); Robin Star Morton Slomkowski, Eugene, OR (US)

( * ) Notice: Subject to any disclaimer, the term of this patent is extended or adjusted under 35 U.S.C. 154(b) by 1399 days.

(21) Appl. No.: 11/933,061

(22) Filed: Oct. 31, 2007

(65) Prior Publication Data

US 2009/0030774 A1 Jan. 29, 2009

Related U.S. Application Data

(63) Continuation-in-part of application No. 09/755,541, filed on Jan. 5, 2001.

(60) Provisional application No. 60/174,781, filed on Jan. 6, 2000.

(51) Int. Cl.
*G06Q 30/00* (2012.01)

(52) U.S. Cl.
USPC .................. 705/14.53; 705/14.55; 705/14.66

(58) Field of Classification Search
USPC ................................. 705/14.53, 14.55, 14.66
See application file for complete search history.

(56) References Cited

U.S. PATENT DOCUMENTS

| | | | |
|---|---|---|---|
| 5,855,008 A | 12/1998 | Goldhaber et al. | |
| 6,012,098 A | 1/2000 | Bayeh et al. | |
| 6,029,141 A * | 2/2000 | Bezos et al. | 705/27.1 |

(Continued)

FOREIGN PATENT DOCUMENTS

| | | |
|---|---|---|
| KR | 99073076 A | 10/1999 |
| KR | 20010078417 | 8/2001 |

(Continued)

OTHER PUBLICATIONS

"Unintrusive Customization Techniques for Web Advertising", Marc Langheinrich, Atsuyoshi Nakamura, Naoki Abe, Tomonari Kamba, and Yoshiyuki Koseki, May 17, 1999, Computer Networks, vol. 31, No. 11-16, pp. 1259-1272.

(Continued)

*Primary Examiner* — Michael Bekerman
(74) *Attorney, Agent, or Firm* — O'Melveny & Myers LLP

(57) ABSTRACT

A system and method is provided for adding an advertisement to a digital message and providing additional communication data to a recipient that interacts with the advertisement regardless of the network device the recipient is utilizing. An advertisement generator residing on a network host accepts digital messages from contributors and allows the contributors to select an advertisement to be displayed with their contributed messages. These digital messages may be sent to specified recipients or published on a Web site. Using stored personal data associated with the contributor and with the recipient of a digital message, in addition to the content of the message itself, the advertisement generator suggests advertisements to be included with the digital messages based on their contextual relevance. In exchange for including an advertisement with a digital message, a contributor is compensated. If the contributor-selected advertisement is provided by a third party advertiser, the message, contributor, and advertisement data is utilized to compensate the contributor of that message for sending it to at least one recipient or posting it on a Web site. If the advertisement is interactive, and the advertisement is interacted with, the advertisement generator will provide the recipient with additional communication data in a format that can be understood by the recipient network device.

26 Claims, 20 Drawing Sheets

(56) References Cited

U.S. PATENT DOCUMENTS

| | | | |
|---|---|---|---|
| 6,205,432 B1 * | 3/2001 | Gabbard et al. | 705/14.73 |
| 6,285,987 B1 * | 9/2001 | Roth et al. | 705/14.71 |
| 6,317,789 B1 | 11/2001 | Rakavy et al. | |
| 6,449,657 B2 | 9/2002 | Stanbach et al. | |
| 6,523,008 B1 | 2/2003 | Avrunin et al. | |
| 6,622,174 B1 | 9/2003 | Ukita et al. | |
| 6,684,257 B1 | 1/2004 | Camut et al. | |
| 6,698,020 B1 * | 2/2004 | Zigmond et al. | 725/34 |
| 2005/0119936 A1 | 6/2005 | Buchanan et al. | |
| 2007/0233556 A1 | 10/2007 | Koningstein | |
| 2007/0244750 A1 | 10/2007 | Grannan et al. | |

FOREIGN PATENT DOCUMENTS

| | | |
|---|---|---|
| WO | WO 96/24213 | 8/1996 |
| WO | WO 99/63453 | 12/1999 |
| WO | WO 00/58882 | 10/2000 |
| WO | WO 01/50703 | 12/2001 |

OTHER PUBLICATIONS

"Panning for Gold in Technology Stocks", Whit Andrews, Omaha World-Herald, Jan. 25, 1998, p. 55.R.

"Hakuhodo Email Service Offers New Year Prizes", Hakuhodo, Inc., Sep. 30, 1996, Advertising Age, V.67, No. 40, p. 48, Crain Communications, Inc.

"Viral Marketing", Jurvetson et al.; Original Version Published in the Netscape M-Files, 1997; Edited Version Published in Business 2.0, Nov. 1998; 6 Pages.

"ISPS Offers Way to Check Email", Interactive Daily; Mar. 14, 1997; Issn: 1083-141X; 1 Page.

* cited by examiner

| Market Segment \ Product | MP3 Player | Running Shoe | Restaurant | Home Mortgage | Video Game | ... |
|---|---|---|---|---|---|---|
| Age < 30 | ☆A | ✦A | | □A | △A | ... |
| Age > 50 | ☆B | | ⬡A | □B | | ... |
| Male | ☆C | ✦B | ⬡B | | △A | ... |
| Female | ☆D | ✦C | ⬡C | | | ... |
| Married | | | ⬡D | □C | | ... |
| ... | ... | ... | ... | ... | ... | ... |

FIG. 5

SYSTEM AND METHOD FOR ADDING AN ADVERTISEMENT TO A PERSONAL COMMUNICATION

CROSS-REFERENCE TO RELATED APPLICATION

This application is a continuation-in-part of U.S. patent application Ser. No. 09/755,541, filed Jan. 5, 2001, which application claims the benefit, pursuant to 35 U.S.C. §119(e), of U.S. provisional application Ser. No. 60/174,781, filed Jan. 6, 2000.

COPYRIGHT NOTICE

This patent document contains material subject to copyright protection. The copyright owner, Anthony Rothschild, has no objection to the reproduction of this patent document or any related materials, as they appear in the files of the Patent and Trademark Office of the United States or any other country, but otherwise reserves all rights whatsoever.

BACKGROUND OF THE INVENTION

1. Field of the Invention

The present invention relates to advertising over a wide area network such as the Internet, and more particularly, to a system and method that allows an Internet user to place an advertisement within a digital message and to receive compensation for doing so.

2. Description of Related Art

The number of Internet users has been growing at an ever increasing rate over the past ten years. InternetWorldStats.com estimates that in 2007, the number of individuals worldwide who have access to the Internet is 1.1 billion, with 211 million of those individuals residing in the United States. Businesses are aware of this growing audience and have responded, spending $12.1 billion on Internet advertising in 2005. This number is expected to double by 2010.

The rapid increase in the number of individuals who have Internet access has lead to, and may in part be attributed to, an increase in e-mail usage. In the United States, approximately 65% of Internet users are over the age of 14 and have active e-mail accounts. Studies have shown that 90% of those e-mail users connect to the Internet primarily to view and send e-mail. Additionally, 40% of those individuals stated that checking their e-mail was one of the first things they do in the morning, as well as one of the last things they do before going to bed. As these numbers suggest, the e-mail users, which worldwide are responsible for generating 10 billion e-mail messages daily, are spending a great deal of time interacting with a medium that is relatively untapped by the advertising industry.

In increasing numbers, Internet users are also turning to web logs, or "blogs," to seek out special-interest information. One study estimates that there are more than 70 million active blogs available on the Internet, featuring news and commentary on a wide range of topics. Most of these blogs also allow readers to post messages in reply to the hosted commentary. Other Web sites host digital bulletin boards or chat rooms in which users post digital messages discussing topics of mutual interest. These digital messages are not limited to text; indeed, millions of users post audio, still images, and video on Web sites featuring user-generated content in order to interact with an online community of users with similar interests. These online communities with focused interests are an appealing target for advertisers, who have begun to recognize the potential of this medium.

With the amount of funds being spent on Internet marketing, it is imperative that those advertising campaigns produce profitable results. This requires advertising service providers to offer focused, result-driven, advertising methods. A basic premise to begin with is that Internet advertisements must produce a positive association in the consumers' mind with the advertised product. A negative association, which can be produced by advertising through unsolicited e-mail, not only does not benefit the organization, but may actually harm it in the long run. For example, if a business buys a list of e-mail addresses from an industry that has a similar customer base, the response they get from the recipient may have quite the opposite effect of that intended. Unsolicited e-mail messages, also referred to as spam or junk e-mail, may annoy the consumer so much that a negative connotation with the product is formed in the consumer's mind, thus reducing sales in off-line markets through poor brand name association.

One way to avoid the negative association created through unsolicited e-mail advertisements is to advertise through solicited e-mails. That is, attach advertisements to standard e-mail messages (or other solicited communications) that are being sent between individuals that have a personal or professional relationship. Advertising in this manner is much less intrusive and appears to the recipient as a platform for the message, instead of the message itself. There are currently at least three different business models that utilize solicited e-mail for advertising. The first is the desired account method used by Hotmail™, which provides an Internet user with an e-mail address in exchange for placing a Hotmail™ (or affiliate) interactive link within every e-mail message that originates from the account. The second is the banner advertisement model, used, for example, by Yahoo™ mail and AIM™ mail, which displays advertisements on screen adjacent to message reading and composing panes so that users view advertisements while composing digital messages and while reading digital messages. This third is the advertisement attachment model, used at various times by Yahoo™ mail and Hotmail™, which attaches an advertisement or advertising link referring to another of that company's Web sites or services to the bottom of outbound digital messages.

The desired account method allows a service such as Hotmail™ to advertise itself to recipients of e-mail messages in exchange for providing and maintaining an e-mail address. The reason this is referred to as the desired account method is due to the popularity of the Hotmail™ name. Internet users prefer to have a Hotmail™ account over other similar accounts (e.g., Mail.com), which are also free, because of the name recognition associated with it.

There are three problems with an advertising service's using the desired account method. First, there is a great deal of setup cost associated with a Web site capable of receiving, storing, and transmitting high quantities of data, as required by an e-mail service provider. Second, the advertiser would need brand name recognition capable of enticing Internet users to become e-mail subscribers, which may prove to be quite hard if the advertiser is not as well known (and attractively viewed) as Hotmail™. Third, an Internet user that already has an e-mail account would be less inclined to sign up for a second one, which would force the Internet user to monitor and maintain multiple e-mail accounts.

Other mail services provide an Internet user with an e-mail account in exchange for placing interactive advertisement links within every e-mail message that originates from the account. Additionally, users may agree to view banner advertisements that pop up while the user is composing or reading digital messages using the network server. The Internet user may also be rewarded by receiving free services or through a point system if the advertisement is deemed successful. The points can later be redeemed through the Web site for merchandise or money. By compensating Internet users for using such a service, businesses that don't have the brand name recognition can pay to have their advertisements included in solicited e-mails.

There are four problems with advertisers using the methods described above. First, Internet users that already have an e-mail account would be less inclined to sign up for a second one, which would force the Internet user to monitor and maintain multiple e-mail accounts. Second, in the absence of any subscription questionnaire (which would provide only minimal information anyway), the advertiser would have no idea what demographic is going to be exposed to the advertisement or whether the recipient of the e-mail will be a consumer that would be inclined to purchase the advertising product. For example, advertisements for dating services could be sent to married couples, which provides the advertiser with little benefit. This leads to the third problem, given that the advertisements are placed at random, the recipient may be offended by the advertisement, thus creating a negative association with the product. Not only does this reflect poorly on the advertiser, but it also reflects poorly on the sender of the e-mail, possibly discouraging future use of such a service. For example, advertisements for McDonalds corporation could be viewed as offensive if they are sent to a Hindu. Fourth, when the advertisers realize the problems associated with such a system, they will only pay the Internet users for advertisements that prove to be successful (e.g., the recipient interacts with the advertisement or makes a purchase). However, this is rather unfair to the Internet user when you consider that 40% of people who purchase a product after they view an online advertisement do so between eight and thirty days after seeing the advertisement.

Another method of Internet advertising that may avoid the negative associations created by unsolicited e-mails is targeting advertising to the special interests of the users of a particular blog, online social network, or online bulletin board. For example, Edmunds™ and Kelley Bluebook™ host a number of online bulletin boards allowing users to post messages discussing automobiles. Advertisements for auto parts, automobile magazines, and automotive accessories placed on these sites likely find a receptive audience among the users of these bulletin boards, reducing the risk that an advertiser would alienate or offend potential customers. However, selecting an advertisement based on the general topic of the blog or bulletin board may still result in advertisements that are of little interest to a large number of users. Accordingly, it would be desirable to tailor advertising more narrowly to individual users or small groups of users to increase the probability that they will interact with the advertisement and ultimately purchase advertised products.

From the above discussion, it is clear that an Internet advertisement service provider should appeal to the user of the online content, the provider of the online content, and the advertiser in order to be effective in the marketplace. In order to appeal to an e-mail recipient, an e-mail message containing an advertisement should be solicited. Thus, it would be preferable if the e-mail message came from someone the recipient knew, either personally or professionally, and the content of the e-mail message was not primarily related to the advertisement. Likewise, to appeal to a blog reader, online social network user, or bulletin-board user, an advertisement should appeal to that user's particular background and interests.

In order for an Internet advertisement service provider to appeal to a contributor of online content, the contributor should be adequately compensated for his trouble. This would include compensating the contributor for the mere presence of an advertisement in a digital communication (whether that communication be e-mail, chat-room dialog, instant messaging, blog postings, Really Simple Syndication (RSS) feeds, online social network messages, etc.). This compensation would be increased if the advertisement was interacted with and/or purchases were made. Additionally, an e-mail service should work in conjunction with a sender's existing e-mail address, thus enabling the sender to only have to monitor and maintain one e-mail account. Finally, the content contributor should be able to choose which advertisements (or advertising entities) are to be included in his digital message. For example, this would allow a person with an interest in sports to attach a Nike™ advertisement to his message, thus portraying himself as an athletically minded individual, much like one does when one wears a t-shirt containing the Nike™ logo.

Finally, an Internet advertisement service provider would appeal to an advertiser if the end product produced advertisements that were placed before interested consumers. By presenting the contributor of a digital message with a palette of relevant advertisements and giving the contributor the ability to choose which advertisements should be incorporated within his digital messages, the advertisement gets displayed before the contributor, who is most likely a consumer of the advertised product, and before a user of that digital message, who, by association, is more likely than not to also share the same interests as the contributor. Additionally, the advertising service should be capable of distributing e-mails and advertisements to recipients operating on non-traditional Internet devices (e.g., mobile phones or other wireless devices). The service should also be flexible enough to adapt to changes within the on-line advertising industry.

Thus, a need exists for a system that incorporates computer-assisted user control over the selection of advertisements to be associated with digital messages, that compensates contributors for their careful selection of a relevant advertisement, and that makes digital messages containing advertisements available to consumers using a variety of network devices to access digital content.

SUMMARY OF THE INVENTION

The present invention provides a system and method for allowing a contributor of a digital message to add an advertisement to the digital message and providing additional communication data to a recipient that interacts with the advertisement regardless of the network device the recipient is utilizing (e.g., personal computer, television set-top box, telephone, consumer appliance, PDA, WAP mobile phone, I-Mode mobile phone, 3G device, WED, WID, Digital Broadcast device, WiMax, Digital Video Broadcast (DVB) systems, game console, GPS, networked multi-media devices, etc.). In an embodiment of the present invention, a sender network device, a recipient network device, and a Web site are connected to, and can communicate through a communication network, such as the Internet, a local area network, a wide area network, or a digital broadcast system. The sender network device communicates with an advertising application operating on a network application server to send a personal communication containing a sender-selected advertisement to the recipient network device or to post that message on the network application server for multiple users to view. The displayed advertisement may be selected by the contributor, or may be selected by the advertising application, or a combination of the two, making use of one or more registered users' profile data, to narrowly tailor the advertisements to be of mutual interest to both the contributor and the user. If the user interacts with the advertisement, the advertising application provides the user network device with additional communication data and the contributor with compensation.

To create a digital message containing a contributor-selected advertisement, the contributor network device communicates with the advertising application operating on a network application server or Web site. If it is the first time the contributor is communicating with the server, the contributor may be asked to register on the server, where registration data and an associated unique identification number is stored in a memory device. Thereafter the contributor will have an opportunity to enter message data (e.g., recipient data, subject data, message content data, and file attachment data) and select an advertisement that will be included along with the message data to be posted or sent to a designated recipient. The sender may choose an advertisement from a sender-created palette of advertisements or from a list of available advertisements divided into searchable categories. When the sender indicates that the message is ready to be posted or sent, the advertising application is presented with message data (pertaining to the digital message), contributor data (pertaining to the contributor or sender), and advertisement data (pertaining to the contributor-selected advertisement). The advertising application then assigns a unique identification number to the message data, as previously done for the sender data (upon registration) and advertisement data (upon submission), and stores the data in the server memory device. The advertising application then utilizes the message data, sender data and advertisement data to format a digital message containing a sender-selected advertisement, which is then posted (e.g., in the context of a blog, other web-based bulletin board service, or other server of user-generated content), or sent to a designated recipient (such as by e-mail, instant message, blog post, online social network comment, multi-user chat, etc.).

Alternatively, the advertising application may scan the content of a digital message that has been created and suggest advertisements to include with the digital message based on the content and subject matter of the particular message. The contributor would then be able to pick a suggested advertisement or set of advertisements to be included with the message. The advertising application will default to the advertisement with the best contextual match in the event that the contributor does not express a preference. Thus the contributor of the digital message may select an advertisement independently, may make a selection from a set of advertisements pre-selected by the advertising application based on the content of the message or the saved profile of the intended recipient, or may allow the advertising application to select the advertisement to be included with the digital message.

Like the contributors, the users (readers) of a server hosting a blog or other user-generated content may be asked to register the first time they access the site and will be asked to register in order to post reply messages. At registration, users will be asked to provide demographic data and, optionally, to indicate some of their interests. This information will be saved in the advertising application as a user profile. Subsequently, as the user posts reply messages or searches for content on the Web site, such information will be saved in the user profile to build up an increasingly detailed database of that user's interests in order to accurately predict what types of advertising will appeal to that user. By allowing a contributor to select from a palette of advertisements he believes would be interesting to his readers, and then allowing the advertising application to further select the particular advertisement from that set that will be displayed to a given user based on the saved user profile, a good alignment of the interests of the contributor and the user may be achieved by combining human and machine selection mechanisms. Thus, despite the fact that a posted digital message is not a direct personal e-mail to particular recipient, a comparable degree of alignment of interest may be achieved notwithstanding the more public nature of a posted digital message. This alignment will likely increase the probability that an advertisement will appeal to the reader.

Advertisements and additional communication data can be provided by the contributor of the digital message, third party advertisers, or the Web site. If the sender-selected advertisement is provided by a third party advertiser, then the sender of that advertisement is compensated for sending it to at least one recipient or for posting it on a bulletin board. Additional compensation may be awarded to the sender if a recipient or user interacts with the advertisement or goes on to purchase a good or service from the third party advertiser. The message, sender, and advertisement data allow the advertising application to determine the compensation due to a particular contributor of digital content.

In addition, advertising content may be provided by the contributor of a digital message who views an advertisement somewhere else on the Internet and desires to include that advertisement with his digital message. In this way, the palette of advertisements from which the contributor may choose would extend to any advertising material that has been distributed on the Internet, regardless of format. The advertising could comprise text, images, video, audio, or any other digital formats known in the art. Advertisers that are interested in distributing their advertisements this way would submit registration data to the advertising application, including compensation data, preferred audience demographic data, preferred audience location data, advertisement expiration dates, and other relevant information. A contributor to a blog or social network or the sender of an e-mail would copy or drag such an advertisement from another location on the Internet over to the advertisement generator to allow the advertisement to be attached to his digital message. The advertisement generator would access the compensation data provided by owner of the advertisement and check the expiration dates and target demographic and location data to verify that the advertisement is appropriate for attachment to the contributor's digital message. If so, the advertisement generator would attach the advertisement to the digital message and arrange for the contributor to be compensated according to the terms provided by the advertisement owner.

A contributor would also be permitted to tag an advertisement appearing somewhere on the Internet in order to use it with a digital message or save it for use with a future digital message and to save a reference to the advertisement in the advertising palette managed by the advertising application. Upon locating a desired advertisement on the Internet, the contributor would tag it by creating a bookmark containing a link to the advertisement's URL along with metadata that the contributor could update to include comments or a short description that would be searchable. The advertising application would then incorporate the tagged advertisement as part of the advertising palette presented to the contributor, allowing the contributor to select and include the advertisement with a later digital message.

An exemplary method of assuring that this system is operable with a variety of network devices is to utilize the Web site's platform-independent architecture, which is developed using a device- and data-neutral software language, such as XML (Extensible Markup Language), along with an advertising application divided into separate output and data processing stages. When a user interacts with an interactive advertisement, the request data (contained in the advertisement's embedded URL) calls to the data processing layer. The data processing layer uses the request data (which may contain message data that is linked to sender data and advertisement data) to retrieve data from the Web site memory device. A portion of the retrieved data is then passed on to the output stage, where it is placed in a template that has been optimized for the targeted recipient network device.

One method of implementing a system to insert user-selected advertisements into digital messages and to compensate contributors for doing so is to use an advertising application running on a network application server. A user will log into the application running on the network server to compose or upload a digital message. The advertising application will then process information including user-profile data about the contributor, contextual information contained in the digital message, user-profile data about the recipient if available, and location information about the contributor and recipient if available, and will present the contributor with a palette of possible advertisements that have a higher degree of contextual relevance to the digital messaging exchange. In order to create this palette, the advertising application will use a ranking algorithm to perform a multi-dimensional fit across a broad set of parameters. These parameters may include demographic data about the contributor and recipient; geographical data about the contributor and recipient which may be determined by GPS, A-GPS, or other mobile wireless network location data in the case of mobile devices and Internet network-location data in the case of TCP/IP-networked devices; contextual data pulled from the contents of the digital message; and historical data about advertisements selected by the contributor in the past. The advertising application will then allow the contributor to select a preferred advertisement from this machine-generated palette for inclusion with the digital message. The contributor will also be allowed to customize the palette by adding or removing advertisements that the machine algorithm may or may not have selected. The advertising application will then format the digital message to include the selected advertisement, and the formatted message will be sent to the selected recipient or posted to the desired blog, online social network, bulletin board, multi-user chat platform, or other user-content server. The advertising application will then compensate the contributor of the digital message for including an advertisement. This compensation may take the form of a discounted or free service, such as an e-mail service or blog hosting service; a payment of points that are redeemable for goods or services; a cash payment; free software; a free or discounted telecommunications service, such as text messaging; a free or discounted audio or video download; or any other good or service given in exchange for the contributor's agreement to include an advertisement with his digital message.

As described above, geographic data may be useful in targeting certain types of advertisements. For example, a mobile phone user may be compensated for sending a digital message and including an advertisement for a local restaurant along with his digital message. As another example, geographic location data could be used to select advertisements for tickets to events occurring in the recipient's local area. The GPS or other location-identifying features of the recipient's mobile phone or other network device could be used by the advertising application to customize the advertising palette presented to the contributor to include advertisements of local relevance.

The advertising palette itself may be organized as a two-dimensional matrix that makes it simple for a contributor to use. For example, advertised products may be listed along a first axis with market segments listed along a second axis. A single product thus might have many advertisements associated with it depending on geographic, demographic, or particular interests of the target recipient. For example, the marketing of a specific model of the Apple iPod™ product range might utilize very different advertisements targeted toward different demographic groups. An advertisement for an over-50 audience might emphasize sound quality and depict classical music, while that for an under-30 audience might emphasize portability and depict rock or rap music. An advertising palette organized in this manner is simple for a user to navigate and allows a large variety of advertisements to be presented to the user for selection. Furthermore, such a palette would allow the contributor of a digital message to select an advertisement for a certain product and allow the advertisement generator to select the particular version of the advertisement to be displayed based on demographic or other data regarding the recipient of that message. For example, a contributor to a blog might decide to advertise an Apple iPod™ with his posted message. He would select the iPod™ advertisement from the palette and enable the advertisement generator to select the particular advertisement from among those directed to various market segments. When a registered user logged into the blog to read the contributor's comment, the advertisement generator would select and display the particular advertisement that was matched to that user's demographic data. If the user was not registered, or demographic data was not available, the advertisement generator would display a default advertisement.

An advertiser network device may also be connected to the Internet, thus enabling advertisers to upload advertisements and additional communication data to the network application server. Additionally, advertisers may be allowed to gather statistical data based upon a particular advertisement campaign. A staff network device may also be connected to the Internet, thus enabling a staff member to maintain the Web site and derive system intelligence.

This system may also be used by a professional marketing staff, by media buyers, or by advertising agencies to quickly and efficiently select advertisements for an online media campaign. The invention provides the marketer with access to a network application server including a database of advertisements and tools for efficiently inserting advertisements, monitoring compensation, and managing the campaign without having to invest in technical tools.

The advertising application described above is able to process digital messages and advertisements that take on a wide variety of formats. For example, the advertisement may take the form of a digital audio file that is attached to a digital message that may be posted or sent to a designated recipient. When the recipient reads the digital message using a recipient network device, the audio advertisement will be played over the audio channel of the recipient network device. The selection of the audio advertisement will be under the control of the sender of the message, but the advertising application will suggest advertisements based on the content and subject matter of the personal communication or on the personal interests of the recipient, if the recipient is a registered user of the Web site with data in a saved personal profile. If the sender does not express a preference as to the advertisement to be included, the advertising application will default to that with the closest contextual match.

The digital message or the advertisement may also take other forms. For example, the digital message may be in the form of a text message, comment, article, or other submission that includes an advertisement displayed in close proximity to the text. The digital message may also be in the form of a digital audio file that the contributor places on the network server and which is either made available for download by users, or is made available for streaming over the Internet such that a user may listen to the digital audio message while connected to the network server. The advertising application would insert a contributor-selected audio advertisement into the contributed audio file such that the advertisement is played to the user before the contributed audio content is played. A contributor may also provide data in the form of voice over Internet protocol (VOIP) packets that are streamed over the Internet to an intended recipient. In this case, an audio advertisement may be inserted into the audio stream. A contributor may also post content in the form of a digital video file or digital video stream. In this case, the contributor will select a video advertisement to be inserted into the contributed video content such that a user will view the video advertisement before viewing the contributed digital video. The posted video files may be made available for download by users visiting a Web site, may be streamed over the Internet to allow a user to watch the video while remaining connected to the Web site, or may be embedded in some other form of digital content such as a blog or a mashup. The contributed digital content may also take the form of digital photographs or images to be shared with other users of the Web site. Again, the contributor will select an advertisement to be displayed along with the contributed images such that users will be able to access both the contributed images and the selected advertisement. In sum, the digital message may take the form of any type of digital content, including text, images, video, or audio, and the advertisement likewise may take the form of any digital content. An advertisement in any format may be combined with a digital message in any format, so long as the recipient or user ends up with access to both the advertisement and the digital message.

Due to bandwidth limitations and the increasing quality and size of video, audio, and image data, users are increasingly likely to send a hyperlink to a location displaying a given piece of data rather than sending the data itself. Thus, a user wanting to share a particular video clip with friends may post the clip to a server and then send an e-mail message to friends with a link pointing to the location of the video on the Internet. The advertising application, running on the server hosting the digital content, can take advantage of this to target an advertisement to the users identified by the contributor of the content. When the contributor of a digital video sends a link to friends, he will have the option of selecting an advertisement specifically targeted to the recipients of his message. If recipients are registered users of the server, the advertising application can suggest an advertisement based on user's profile, and the sender can select which advertisement to send to each recipient of the link. When a recipient of an e-mail message containing a link follows that link to access the video stored on the server, the advertising application will insert the selected advertisement into the video stream such that the user will first view the advertisement and then be able to view the shared video. A novel aspect of this invention over the prior art is that the contributor has control over the content that is combined with or inserted into his digital message, thus adding value by precisely targeting interests of the intended viewer or recipient.

The system for inserting advertisements into digital content also applies to messages or digital content provided to registered recipients of the digital content who have agreed to provide demographic or other personal data in order to receive the digital content and advertisements. In return for providing demographic data and current location data, if available, and accepting advertisements selected by the contributor of the digital content, such users are given access to the contributor's digital message or content. Such advertising can be better targeted to the recipient based upon the the demographic and location data provided by the recipient, the recipient's stated preferences at the time of registration, subsequent updates to personal or demographic data, or the contributor's choice of advertising linked to the content of the message.

Likewise, this system for inserting advertisements applies to shared audio files. When a user follows a link to access a shared audio file, the advertising application inserts an audio advertisement into the audio clip such that the user must first listen to the advertisement before listening to the audio clip. Still images are handled in much the same way. A contributor may choose to store a quantity of image files on an Internet server and may distribute links to friends and select an advertisement that should be featured when each of them accesses the link. In this case, the advertisement would be displayed alongside the requested still image, or may be superimposed over a portion of the still image.

In other cases, a contributor might not send a link to digital content directly, but might create a message comprising linked digital content, or post such a link in a blog, chat room, or other semi-public Internet space. In that case, when a user attempts to follow a link from a blog or other site, the advertising application will be able to retrieve the Internet address of the referring site and display an advertisement that is appropriately aligned with the interests of the users of that site. If users following the hyperlink are logged in to a Web site that requires registration, additional personal profile information may be sent to the advertising application in order to further refine the selection of an advertisement that will likely appeal to that user.

In addition to selecting advertisements to be displayed alongside digital content, a contributor may also select an advertising logo or brand name to be associated with his or her own personal identifying information and to be displayed as part of a digital signature identifying the contributor of a particular digital message. Such an association of a brand name with the identity of a particular contributor will serve as a personal endorsement of that brand or product and may be particularly effective in the context of an online community or online social network in which users participate because they are already highly interested in what the other contributors have to say. For example, users of online social networking sites, such as MySpace or Facebook, create digital signatures that may include a photograph, symbol, or other visual representation of the identity they wish to present to other users of the online social network. By selecting an advertising logo or brand name as part of their signature, users will receive compensation for posting messages displaying the selected advertisement.

This invention is also applicable in the context of virtual world applications, such as Second Life and Cyworld, in which users create a virtual personality, or avatar, that is displayed to other users. The user customizes or personalizes the avatar and its virtual "property" with items he wishes to share with or display to other users of the virtual world. Such a user would be compensated for selecting an advertisement to be displayed as part of the avatar or its virtual environment. Thus, real advertisements would be displayed to users interacting in this virtual world as they share their digital creations. These advertisements would not be limited to visual displays but may include other multimedia (audio, video, and text) formats within the virtual environment.

Just like primary contributors, users posting replies to content they have viewed on a blog, online social network, or other user-content site are able to include advertisements in their responses. Though their responses are posted in a relatively public forum, they are primarily messages directed to an author of digital content or to another user who has posted a comment. Thus, the advertising application is able to select appropriate advertisements based on the author of the message to which a given user is replying. For example, when a user contributes a reply to a blog post, that user is really sending a personal message to the author of that blog, about whom the advertising application has a great deal of information. The advertising application is thus able to select an advertisement that is well matched to the interests of the primary blog contributor and is thus more likely to be one with which the blog author will interact. The advertising application is thus able to use such information to assemble a palette of advertisements from which the user posting a reply may make a selection and receive compensation for doing so.

The preceding discussion has presented an overview of a system for adding an advertisement to a digital communication in a way that provides certain advantages for advertisers and contributors of digital messages. A more complete understanding of this system will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 5 depicts an exemplary embodiment of an advertising palette illustrating advertisements classified by product type and target market segment.

FIG. 20 depicts the application of this invention to a virtual world application in which a user is able to select real advertisements to be displayed in a virtual environment for other users to see and interact with.

DETAILED DESCRIPTION OF THE PREFERRED EMBODIMENT

Figure 1:
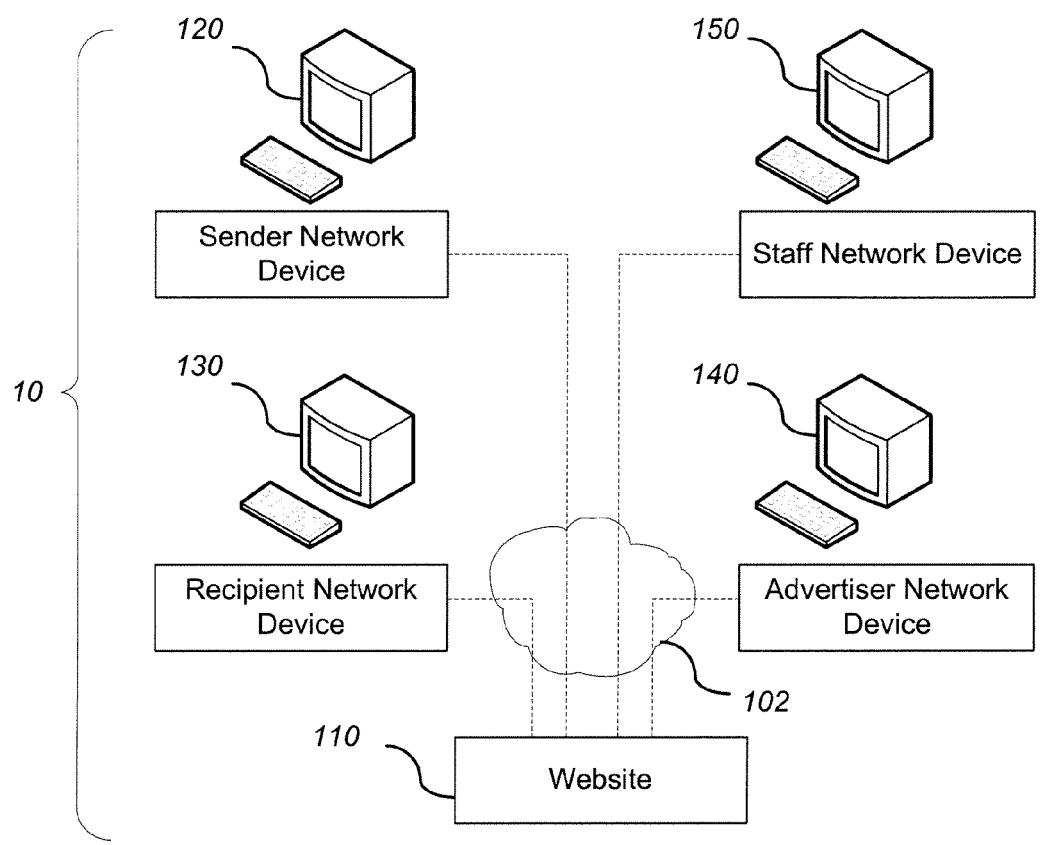
FIG. 1 is a high level architectural drawing of a system that operates in accordance with one embodiment of the present invention to send a personal communication containing an advertisement to at least one recipient over a network.

The present invention provides a system and method for adding an advertisement to a digital message, providing compensation to the contributor of that message in exchange for adding an advertisement, and providing additional communication data to a recipient that interacts with the advertisement regardless of the network device the recipient is utilizing. The advertisement may be selected by the contributor of the digital message, by a contextual algorithm running on a network application server, or by a combination of both. In the detailed description that follows, like element numerals are used to describe like elements illustrated in one or more figures. Various terms and acronyms are used throughout the detailed description, including the following:

Application Program. Within the context of computer hardware and software, an application program is a set of one or more computer programs that performs a function when executed within a computer hardware device. If the set is comprised of plural programs, the programs are coordinated to perform a function together; such programs may individually perform other functions. Similarly, a program may be comprised of plural modules that perform certain functions individually and other functions when combined in various ways.

Internet. A collection of interconnected (public and/or private) networks that are linked together by a set of standard protocols (such as TCP/IP and HTTP) to form a global, distributed network and which are connected by fixed-line or wireless network devices. (While this term is intended to refer to what is now commonly known as the Internet, it is also intended to encompass variations that may be made in the future, including changes and additions to existing standard protocols.) Web Site. A computer system that serves informational content over a network using the standard protocols of the World Wide Web. Typically, a Web site corresponds to a particular Internet domain name and includes the content associated with a particular individual, business, or organization.

Web Server. A device for transmitting data over the Internet (which may also prevent the transmission of data) encompassing the hardware/software server components that serve information content over a network and the "back end" hardware/software components, including any non-standard or specialized components, that interact with the server component to perform services for Web site users.

Network Application Server. The hardware and software components of a server that receives, stores, sends, and makes available information over network connections, including wired internet networks, wireless networks, cellular networks, and other networks over which users exchange information.

Blog. Also called a "web log." A Web site containing entries, usually in reverse chronological order, submitted by one or more contributors on a regular basis, commenting on or providing information or commentary about a particular subject. In additional to textual content, many blogs include multimedia content, including audio, video, and still images. Most blogs also allow registered users to post reply messages to the content posted by the primary author or authors.

Mashup. An application that combines data from multiple sources. It may comprise a Web site that includes content from multiple other Web sites, or it may comprise video from multiple sources combined to appear as a single video.

The foregoing definitions are not intended to limit the scope of the present invention, but rather are intended to clarify terms that are well understood by persons having ordinary skill in the art. It should be appreciated that the defined terms may also have other meanings to such persons having ordinary skill in the art. These and other terms are used in the detailed description below.

Preferred embodiments of the present invention operate in accordance with a plurality of network devices, such as a sender network device, a recipient network device, and a Web site. The sender network device, the recipient network device, and the Web site are coupled together on a communication network, such as, the Internet, local area network, wide area network, or digital broadcast system. FIG. 1 depicts an advertising system 10 that operates in accordance with one embodiment of the invention. In this embodiment, the Web site 110, the sender network device 120, the recipient network device 130, an advertiser network device 140, and a staff network device 150 are connected to, and can communicate through, the Internet 102. It should be appreciated that the network devices depicted in FIG. 1 (i.e., sender network device 120, recipient network device 120, advertiser network device 140, and staff network device 150) are intended to be representative in nature and are not to be viewed as limitations, either as to the number or type of network devices utilized in the present invention. Other network devices, including, but not limited to, personal computers, television set-top boxes, telephone, consumer appliances, personal digital assistants (PDAs), wireless application protocol (WAP) mobile phones, I-Mode mobile phones, 3G devices, wireless entertainment devices (WEDs), networked game station (e.g., Playstation™, Xbox™), wireless information devices (WIDs), digital broadcast devices including all standards of DVB, and other physical and wireless connected network devices, regardless of their network protocol (e.g., WiFi, Bluetooth, GSM), generally known to those skilled in the art are within the scope and spirit of this invention.

Figure 2:
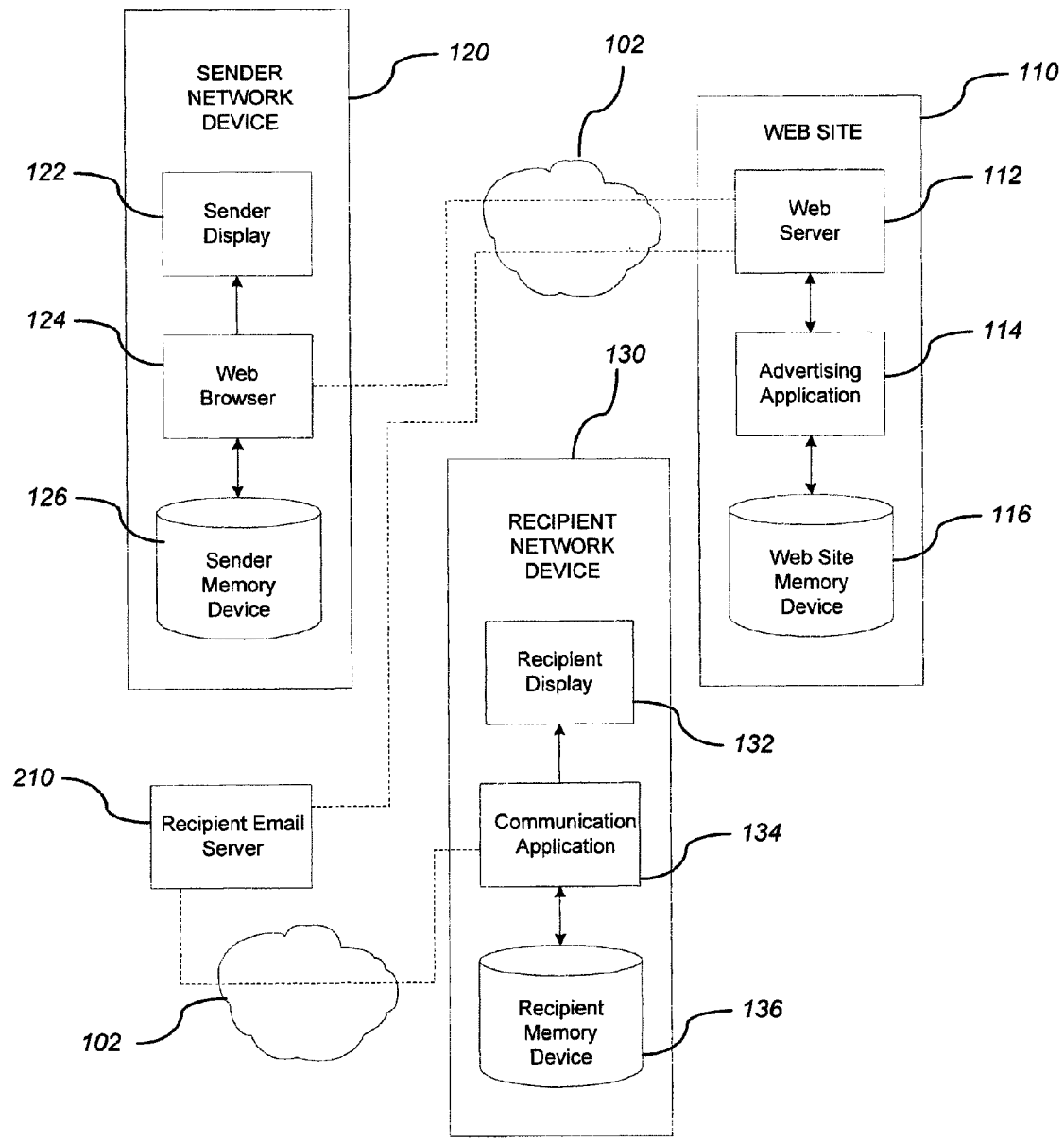
FIG. 2 is a diagram illustrating the primary components of the system illustrated in FIG. 1.

As shown in FIG. 2, the sender network device 120 includes a sender display 122, a Web browser 124, and a sender memory device 126. The recipient network device 130 includes a recipient display 132, a communication application 134, and a recipient memory device 136. Finally, the Web site 110 includes a Web server 112, an advertising application 114, and a Web site memory device 116. The advertising application 114, operating on the Web site 110, permits a sender to create, and send a personal communication containing a sender-selected advertisement to the communication application 134, operating on the recipient network device 130. For an e-mail message, the communication application 134 may be an e-mail application (e.g., a POP3 or IMAP server), whereas for social-networking messages, the communication application 134 may be a Web browser. The personal communication received by the communication application 134 may be displayed on the recipient display 132 or stored in the recipient memory device 136. It should be appreciated that the memory and display devices depicted in FIG. 2 are intended to be representative in nature, and other embodiments are within the scope and spirit of this invention. The memory devices depicted in FIG. 2 (i.e., sender memory device 126, recipient memory device 126, and Web site memory device 116) can be long or short term data storage devices, including, but not limited to, RAM, cache memory, flash memory, magnetic disks, optical disks, removable disks, SCSI disks, IDE hard drives, SATA hard drives, holographic storage devices, tape drives, smart cards, and all other types of data storage devices (and combinations thereof, such as RAID devices) generally known to those skilled in the art. The display devices depicted in FIG. 2 (i.e., sender display 122 and recipient display 132) can be a video monitor, television, LCD/plasma flat screen, LED, OLE, or any other display devices generally known to those skilled in the art.

The sender network device 120 is used to send a personal communication, together with a sender-selected advertisement, to the recipient network device 130 via the Web site 110. Alternatively, the sender network device 120 is used to upload a digital message to the Web site 110, where the message is published and later viewed or downloaded by the recipient network device 130. It should be appreciated that a digital message can include, but is not limited to, an e-mail message, text message, short message service (SMS) message, multimedia messaging service (MMS) message, blog message, chat-room message, instant messaging message, video message, video calling message, voice or audio message, and any other personalized network communications generally known to those skilled in the art. Additionally, the personal communication can contain message data including, but not limited to, text data, graphic data, audio data, image or video data, and all other types of electronically transmitted data generally known to those skilled in the art. The sender-selected advertisement that is contained within the personal communication can either be static or interactive. A static advertisement is an icon, graphic, text message, voice message, or video message that is intended to provide the recipient with a simple message, wherein the simple message can be obtained by viewing and/or hearing the static advertisement. An interactive advertisement is an icon, graphic, text, or voice message that can be interacted with to provide the recipient with additional communication data, wherein the additional communication data is provided to the recipient when the recipient interacts with the advertisement. It should be appreciated that the types of additional communication data include, but are not limited to, text data, digital image data, voice data, video data, and all other types of electronically transmitted data generally known to those skilled in the art.

Figure 3:
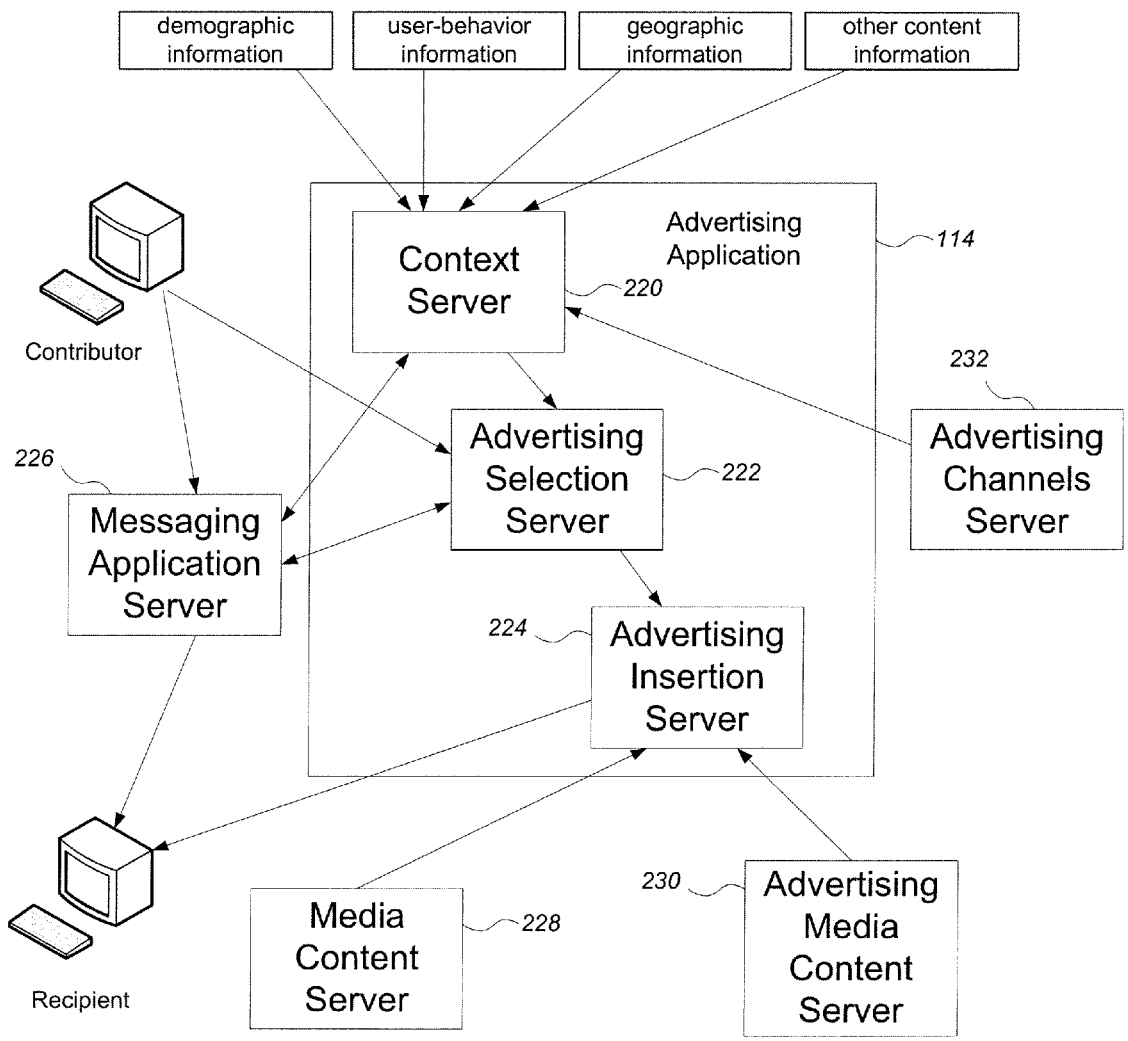
FIG. 3 is a more detailed diagram depicting the advertising application and illustrating its interaction with servers hosting advertisements and servers hosting digital message content.
Figure 4:
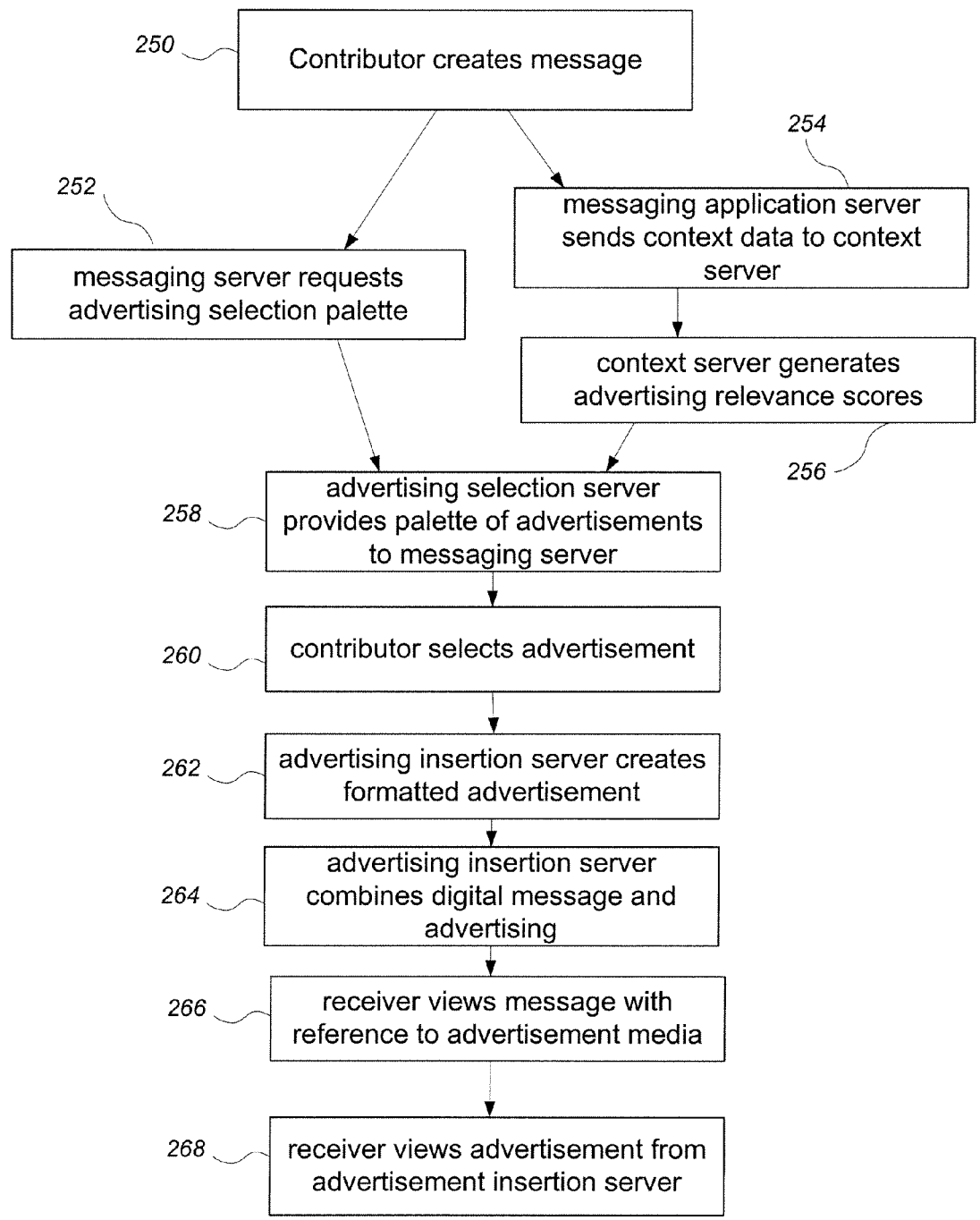
FIG. 4 is a flow chart depicting the process in which a contributor of a digital message engages to compose a message and select an advertisement to be included with it.

FIG. 3 is a more detailed drawing of a preferred embodiment of the advertising application 114 running on the network application server. The advertising application 114 comprises a context server 220, an advertising selection server 222, and an advertising insertion server 224, which will each be described in more detail below. It should be appreciated that the advertising application is a logical collection of servers that may reside on a single network server or on a number of servers linked together using a network protocol such as TCP/IP. In describing the functionality of the system depicted in FIG. 3, the contributor of a digital message will be assumed to be a user of a web-enabled mobile phone who is reading and responding to messages displayed on a blog hosted on an internet Web site. However, it should be understood that the advertising application is equally applicable to users of personal computers or other network devices sending e-mail, visiting an online social networking site, or accessing any other form of network application server. A flow chart of these operations appears in FIG. 4, and the numerical labels in the description below refer to elements of the block diagram depicted in FIG. 3 and the flow chart depicted in FIG. 4.

In this example, the user (contributor) has logged into a messaging application server 226 that is hosting a blog. The contributor wishes to post a message in reply to something he has read. He composes a message and sends it to the messaging application server 226, as shown in step 250. The messaging application server communicates with the advertising application 114, sending contextual information to the context server 220, in step 254, and requesting an advertising palette from the advertising selection server 222, in step 252. The contextual information sent to the context server 220 includes the contributor's profile data, comprising demographic information and historical use information, the recipient's profile data (in this case, profile data about the author of the posting the contributor is responding to), geographic information about the contributor and recipient, which may be derived from GPS, A-GPS, mobile phone number look-up, or other mobile wireless location services, and message-based context information derived from the contents of the digital message itself. The context server 220 analyzes and scores the contextual information and receives lists of possible advertisements from the advertising channels server 232, as shown in step 256. The context server 220 sends this information to the advertising selection server 222 which then uses this information to create a palette of advertisements that are most relevant to the contextual information collected, as shown in step 258.

For example, assume that the advertising channel server 232 contains advertisements from three sources: a restaurant, a digital music player manufacturer, and a running shoe company. Each company that advertises also provides profiles of the kinds of information it is looking for. For example, each advertiser will provide a milieu, or general social setting for its advertisements. Each will also provide keywords that might be associated with interest in the particular product. Some advertisers may be interested in particular local markets and will provide location data. For example, a restaurant may want to target customers within a particular distance of one of its locations. Event organizers may wish to target customers residing in the area near a scheduled event. Others may be interested in particular pieces of information, for example, a digital music player manufacturer may be interested in the musical taste of its customers and may want to tailor its advertisements according to those tastes. The context server 220 evaluates the contextual data based on contributor and recipient profiles and digital message context and calculates a parameterized distance to each of the advertisements obtained from the advertising channels server 232. The advertising palette presented to the contributor, step 258, thus contains advertisements that are preselected to optimize as far as possible the contextual matches. The contributor then selects one of these advertisements to accompany his digital message and posts his message to the blog messaging application server 226, as shown in step 260. The advertising insertion server 224 then formats an advertisement based on the contributor's selection, as shown in step 262. The advertising insertion server may then physically combine the digital message and the selected advertisement, in step 264, or may generate an alternate hyperlink such that when the reader of the digital content attempts to access the content, he is first directed to the advertising insertion server which displays the selected advertisement to the user before returning him to the messaging application server 226, which serves the digital message, as shown in steps 266 and 268. Though FIGS. 3 and 4 have been explained in the context of a mobile phone user accessing a blog, those skilled in the art will recognize that this method is equally applicable to other network devices and to other network application servers, such as e-mail servers, online social network servers, and servers hosting virtual world networks.

In addition, the advertising selection application could exist as a mobile phone application or desktop application. As such, it would receive information over a Web-based network protocol, but would also allow the insertion of an advertisement or a link to an advertisement into live video streams of video calls. Likewise the application would allow the insertion of an advertisement or a link to an advertisement into live audio streams.

FIG. 5 depicts one example of an advertising palette that may be presented to a contributor of a digital message by the advertising selection server 222. In this palette, advertiser's products are arranged along the horizontal axis where we see products being offered by a digital mp3 music player manufacturer, a running shoe manufacturer, a restaurant, a home mortgage broker, and a video game manufacturer. Along the vertical axis are several market segments corresponding to an under-thirty age group, and over-fifty age group, a male classification, a female classification, and a married individual classification. These categories and products, of course, are merely illustrative of one type of breakdown that might be represented in the advertising palette. At the intersection of each row and column, an advertiser may have placed an advertisement that was specifically selected for that particular market segment. For example, the mp3 manufacturer has selected one type of advertisement for a specific product or model, which may depict young people listening to rap music, as the advertisement suggested for the under-thirty market segment, and it has selected another advertisement for the over-fifty segment, which might feature people listening to classical music. The video game manufacturer, on the other hand, has selected the same advertisement for use with the under-thirty market segment and the male market segment. It has selected no advertisements for the female market segment or the over-fifty market segments. Presented with a palette like this one, a contributor may quickly search through available advertisements and select one that is particularly well aligned with the specific digital message he is creating.

In addition to providing the contributor of a digital message with a convenient and easily navigable interface for selecting advertisements, the advertising palette depicted in FIG. 5 also enables an efficient system for more precisely targeting advertising based on a combination of human and machine selection of advertisements. For example, FIG. 5 depicts a number of advertisements provided by a restaurant company. The company may own a number of different restaurant chains, including low-priced family restaurants, up-scale gourmet restaurants, and restaurants featuring live music. The restaurant corporation might determine that advertisements for its family restaurants are best targeted to a married population, its gourmet restaurants are best targeted to an over-50 population, and its restaurants with live music are best targeted to an under-30 population. It would allow the advertisement generator to organize its advertisements accordingly within the palette by including metadata identifying market segments with which to associate each advertisement. The contributor of a digital message may decide to select an advertisement from this restaurant company to appear with his digital message, but may decide to select only the restaurant company and not the particular restaurant to be advertised. If the digital message were an e-mail, the advertisement generator would look up demographic information regarding the recipient, if the recipient were a registered user, and then select the particular advertisement, from among the advertisements provided by the restaurant company, that was best aligned with the demographics of the recipient. In the case of a recipient that was not a registered user, the advertisement generator would supply a default advertisement. Similarly, if the digital message provided by the contributor were a blog posting, the advertisement generator would dynamically choose the particular advertisement to display with the blog posting at the time a registered user logged into the network server hosting the blog. Thus registered users logging in to read the posted blog message would see advertisements tailored to their particular demographic profile.

Figure 6:
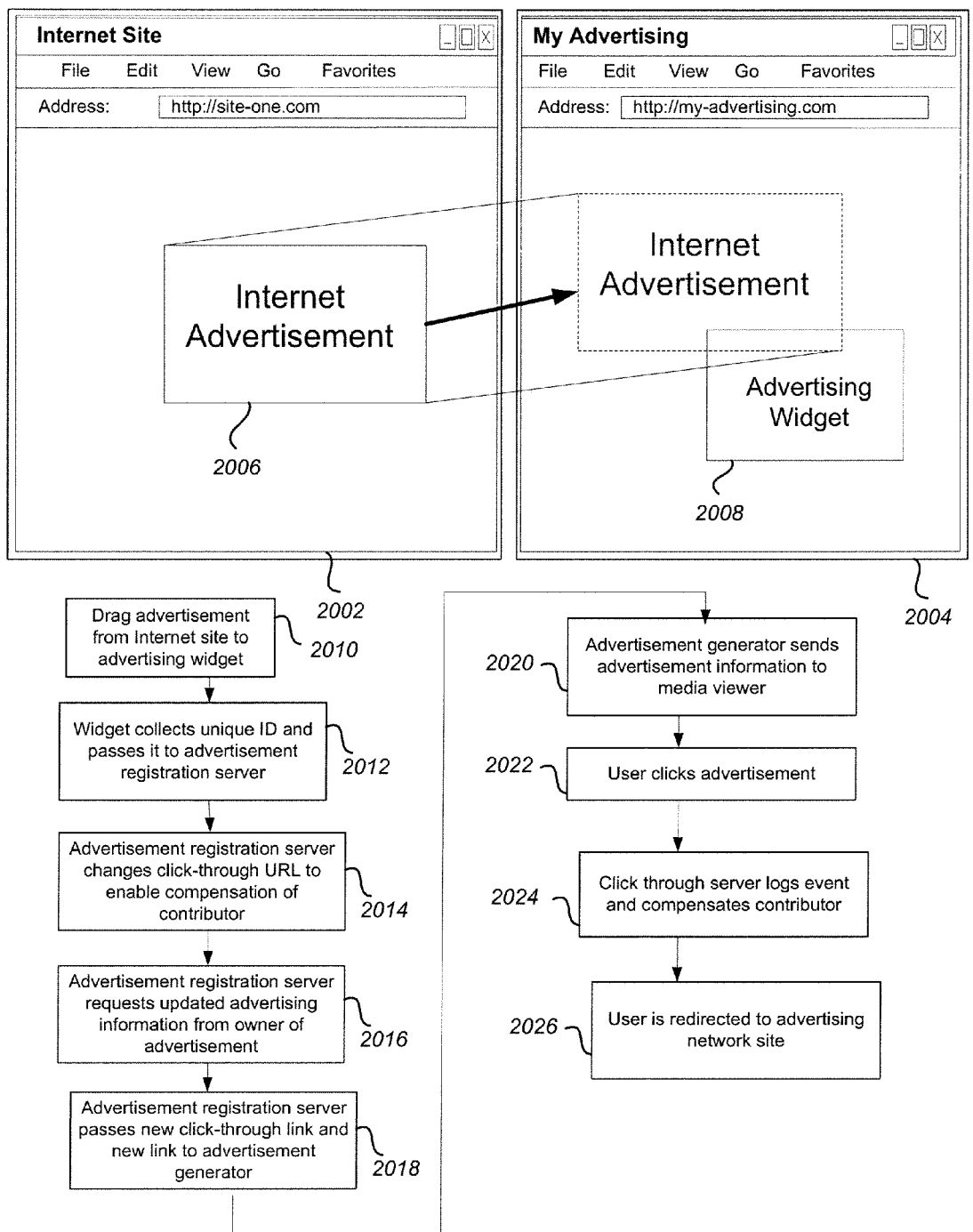
FIG. 6 depicts an exemplary embodiment of an Internet advertisement tagging process, including a flow diagram showing how advertisements are copied from the Internet to the advertising server.

The advertisements presented to the contributor may be provided directly by third party advertisers, may be created by the advertisement generator, or may be provided by the contributor himself. FIG. 6 depicts one embodiment of the invention by which a contributor is permitted to provide advertisements to the advertisement generator by copying or dragging them from other locations on the Internet. For example, a contributor may see an advertisement that appeals to him on a blog he is reading or may receive an advertisement in an e-mail that he would like to use with his own digital messages. If the owner of that advertisement participates in this method of distributing its advertisements, the contributor would be able to copy or drag this advertisement from the Internet location at which it appears to the advertisement generator in order to make it available for inclusion with the contributor's digital messages. FIG. 6 depicts a representative Internet site 2002 on which appears an advertisement 2006 that the contributor desires to include with a current or future digital message. The contributor drags the advertisement 2006 to a widget associated with the advertisement generator 2008. The advertisement generator then attaches the selected advertisement to a digital message provided by the contributor or stores it in the advertising palette for future use. In order to participate in this method of distribution, an advertiser registers with the advertisement generator to provide compensation data, preferred audience demographic and location data, an expiration date, and other relevant information. It would create a unique identification number to be associated with each type of advertisement it wishes to distribute in this way. When a contributor of a digital message viewed such an advertisement on the Internet, he would be able to copy or drag the advertisement to the network server hosting the advertisement generator, and the advertisement generator would incorporate the advertisement into the advertising palette or alternatively insert it directly into a digital message provided by the contributor. The unique identification number would be passed to the advertisement generator to enable identification of the owner of the advertisement and to access compensation data, demographic and location data, and expiration date information. The advertisement generator would then attach the advertisement to the contributor's digital message directly, or would attach a hyperlink that a recipient would follow in order to access the digital message and the advertisement. The advertisement generator would modify the target of the hyperlink as needed in order that the contributor would be compensated for including the advertisement with his digital message.

The flow diagram depicted in FIG. 6 illustrates the process of copying or dragging advertisements located on the Internet to the advertisement generator. In this implementation, the advertisement generator uses a widget, or a piece of executable code that may be written in JavaScript or Flash or similar programming language, to receive and process the information dragged by the contributor from somewhere on the Internet to the advertisement generator, as indicated in step 2010. The widget would identify the Uniform Resource Locator (URL) of the advertisement selected by the contributor to verify that it is a valid URL and would pass along the unique identification number associated with the advertisement to the advertisement registration server, as shown in step 2012. The advertisement registration server would then be able to pull up information provided by the owner of the advertisement, including compensation data, as shown in step 2014, and would modify the click-through URL in order to enable compensation of the contributor selecting the advertisement. The advertisement registration server would then be able to retrieve applicable updates for the advertisement and metadata from the owner of the advertisement, as illustrated in step 2016. The advertisement registration server would then pass the new click-through link to the advertisement generator, as shown in step 2018, and the advertisement generator would then serve the advertisement to a media viewer, such as a Web browser or mobile phone, which would render the advertisement and display it to a user, as shown in step 2020. When a reader of the contributed digital message then clicked on the advertising link, as shown in step 2022, the click-through link would allow the advertisement registration server to log the event, shown in step 2024, allowing the contributor of the message to be compensated for including the advertisement, and the reader would be redirected to the advertisement page, as shown in step 2026.

In another embodiment, the function of importing an advertisement from another location on the Internet is performed using a plugin or extension that operates with the Web browser used to navigate the Internet. This allows the advertisement generator to insert advertisements into arbitrary applications or as part of mashups without requiring any technical or commercial cooperation from the service providers. In this case, the modification of the advertisement URL to redirect a user to the click-through link would be performed by a plugin or extension of the Web browser when the user drags or copies an advertisement from elsewhere on the Internet to a text-entry field displayed on the Web browser.

Figure 7:
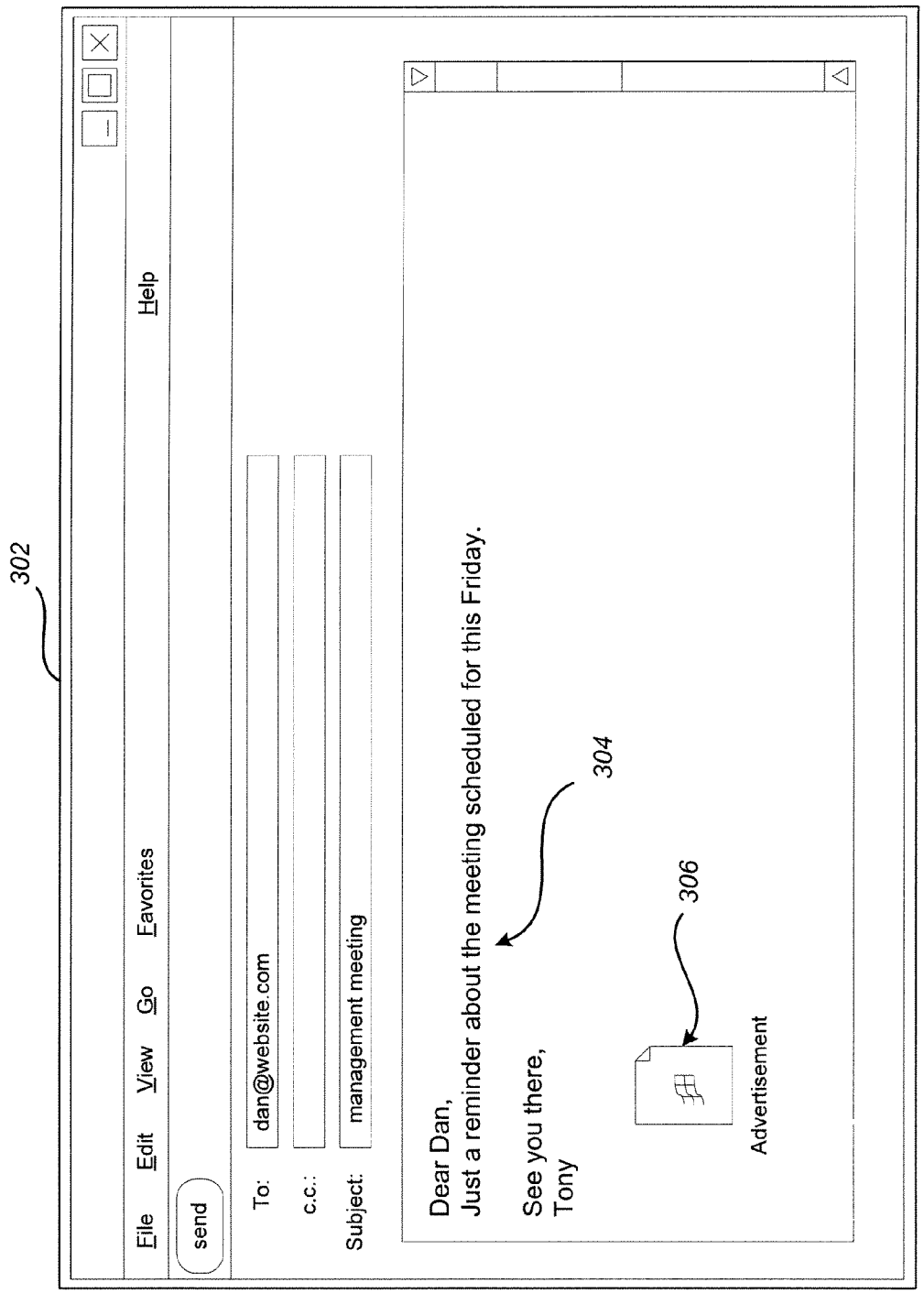
FIG. 7 is a diagram illustrating an exemplary e-mail message containing a sender-selected advertisement.

The advertising application is, of course, also well suited to an e-mail application server. FIG. 7 depicts an e-mail message 302 directed to a recipient. The e-mail message contains a personal message 304 and a sender-selected advertisement 306. If the sender-selected advertisement 306 is a static advertisement, then the recipient will merely have an opportunity to view the advertisement as provided in the e-mail. If the sender-selected advertisement 306 is an interactive advertisement, then the recipient will also have an opportunity to interact with the advertisement to receive additional communication data. It should further be appreciated that advertisement (either static or interactive), as well as any additional communication data, can be provided by the sender of the personal communication, by a third party advertiser, by the Web site, or by any other party that has access to the Internet. For example, the sender, in an attempt to share some humor, may send a personal communication to a recipient containing an interactive, sender-provided, advertisement that advertises an animated cartoon. If the recipient interacts with the interactive advertisement, the recipient will be provided with additional communication data (e.g., graphic, text, audio, video) pertaining to the animated cartoon. Alternatively, the sender, for either esthetic or compensatory reasons, may send a personal communication to a recipient containing an interactive, third party advertiser-provided, advertisement that advertises Nike™. If the recipient interacts with the interactive advertisement, the recipient will be provided with additional communication data (e.g., graphic, text, audio, video) pertaining to Nike™. It should be appreciated that these examples are not intended to limit the subject matter of the additional communication data that can be provided to the recipient network device. The additional communication data can contain advertisement data, entertainment data, educational data, or any other type of data made available to the Web site.

To send a personal communication containing an advertisement to a recipient, the sender would interface to the Web site 110 via the sender network device 120. Specifically the Web browser 124, operating on the sender network device 120, interfaces over the Internet 102 with the Web server 112, which is operating on the Web site 110. If the sender has not used the Web site 110 before, data may be displayed on the sender display 122 prompting him to register. Registration may include providing data, such as name, e-mail address, mailing address, and profile information. After registration is complete, a user name and password would be sent to the e-mail address provided by the sender. The sender then uses the user name and password to access a communication page on the Web site 110.

Figure 8:
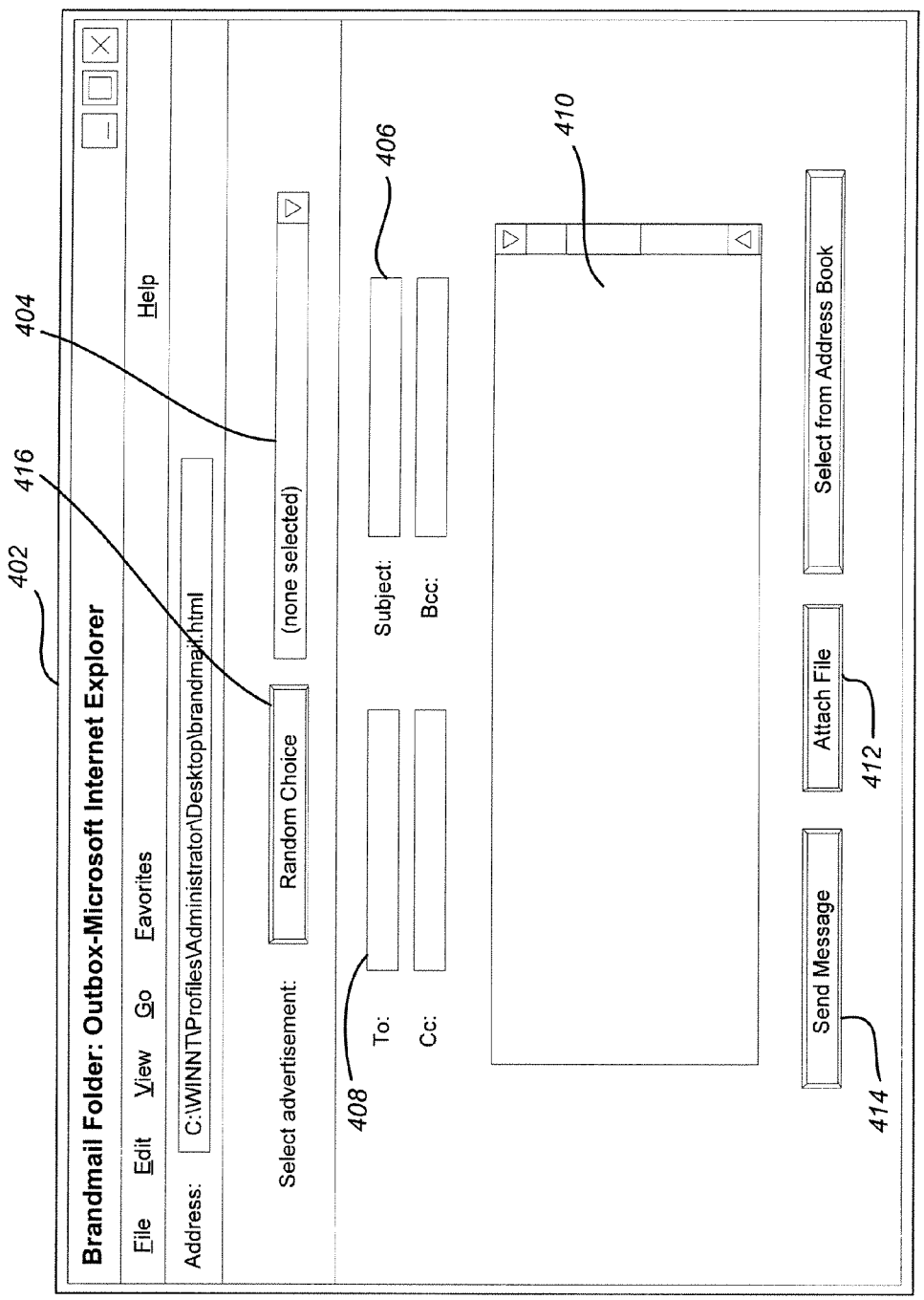
FIG. 8. is a diagram illustrating an exemplary Web page utilized to gather data for providing a recipient with an e-mail containing a sender-selected advertisement.

If the sender indicates a desire to send an e-mail message to a recipient, he may be provided with an e-mail communication page 402, as shown in FIG. 8. It should be appreciated that other communication pages specifically designed for sending text messages, SMS messages, blog commentary, chat-room messages, instant messaging messages, video messages, voice messages, and other personal communications are within the sprit and scope of this invention. The e-mail communication page 402 provides a recipient space 408 where the sender can designate at least one recipient that will receive the e-mail. The sender is further provided a subject space 406 and a message space 410, where the subject matter and the contents of the e-mail can be added. The e-mail communication page 402 may also provide the sender with an attach file button 412, which allows the sender to attach separate files to the e-mail that are to be routed to the designated recipient(s). The e-mail communication page 402 further provides a pull down menu 404 for selecting an advertisement that is to be included within the e-mail. The pull down menu 404 gives the sender the ability to choose an advertisement from a palette of advertisements assembled by the advertising server, as outlined in FIGS. 3 and 4.

A sender is allowed to modify the palette of advertisements stored in the Web site memory device 116 (see FIG. 2). The palette contains advertisements that the sender has previously selected as well as those selected by the advertising application 114. The sender may have the option of adding additional advertisements to the palette and removing advertisements from the palette. Additionally, the advertising application, the third party advertisers, or the Web site staff may also have the ability to remove advertisements from the sender's palette (e.g., upon the expiration of an advertisement). Further, the advertising application may alter the palette of advertisements presented to the sender based on the content of the digital communication. The advertising application can scan the content of the contributed message and add or subtract advertisements from the palette depending on the closeness of the contextual match. The advertising application may also alter the palette of advertisements based upon the selected recipient of the communication. When the sender enters a recipient address in the destination window 408, the advertising application will search its database of user profiles to determine whether the recipient is a registered user and whether user profile information exists for that user. If such information exists, the advertising application will add or remove advertisements from the sender's palette to include those most likely to align with the user's interests and to remove those most likely to offend the user. To aid in the adding of advertisements to the sender's palette, the sender will be able to choose from available advertisements that are stored in the Web site memory device 116 (see FIG. 2). The available advertisements are sorted by category and market segment, as described in FIG. 5, making them easier for the sender to locate. The categories may include, but are not limited to, advertising source, product category, compensation value, popularity, product name, or date added. Once the sender has a palette of advertisements, those particular advertisements will be displayed to the sender through the pull down menu 404. The sender has the option, through the pull down menu 404, to select an advertisement to accompany the e-mail, select that no advertisement is to accompany the e-mail, or select that an advertisement should be randomly selected, using the random choice button 416, either from the sender's palette or from the available advertisements, to accompany the e-mail.

At this point, the sender can depress the send message button 414 to send the e-mail (which includes the attachment(s) and the selected advertisement) to the designated recipient(s). The reply-to data contained in the e-mail, which is the e-mail address that is used if the recipient depressing the "reply-to" button on their e-mail client (e.g., Microsoft Outlook™), is replaced with the e-mail address provided by the sender upon registration. This allows replies (using the "reply-to" button) to e-mails to be routed directly to the sender's provided e-mail address. The e-mail will appear to the recipient as if it came from an e-mail advertisement service provider's domain. If the recipient attempts to route an e-mail reply to the listed address, the advertising application 114 (see FIG. 2) will re-route the e-mail to the sender's provided e-mail address.

Referring back to FIG. 2, data pertaining to the sender's e-mail will be stored in the Web site memory device 116 at approximately the time an e-mail is routed to the designated recipient(s), or when a chat-room or blog message is posted to a server. This data may include, but is not limited to, message data (pertaining to the personal communication), sender data (pertaining to the sender), advertisement data (pertaining to the sender-selected advertisement), and identification numbers associated with each group of data. The sender data and the advertisement data (or their identification numbers) will allow the advertising application 114 to keep track of the advertisements that are being selected, and the senders that are sending those advertisements. The message data, which is linked to the sender data and the advertisement data, allows the advertising application 114 to provide additional communication data to a recipient that interacts with an interactive advertisement (discussed below).

In another embodiment of the invention, the sender may submit a populated communication page as additional communication data (as opposed to personal communication data). In this instance, the advertising application 114 generates a personal communication directed to a sender-provided recipient. The personal communication is sent containing a sender-selected advertisement that is adapted to provide an interacting recipient with additional communication data (i.e., the populated communication page). The sender-provided recipient and the sender-selected advertisement may be provided by the sender or extracted by the advertising application 114 from the sender-submitted populated communication page. For example, if a sender submitted a populated e-mail communication page as additional communication data, then the advertising application 114 would generate a personal communication directed to the recipient contained within the populated e-mail communication page. The advertising application 114 would then create an interactive advertisement from data contained within the populated e-mail communication page (e.g., sender name, subject matter, content). The personal communication, containing the interactive advertisement, would be routed to the recipient network device 130. If the recipient interacted with the interactive advertisement, the recipient would be provided with the populated e-mail communication page submitted by the sender.

As previously discussed, the advertisement, as well as the additional communication data may be provided by a variety of sources (e.g., sender of the personal communication, third party advertiser, or Web site). If a sender-selected advertisement is provided by a third party advertiser, then the sender of that advertisement is compensated for sending it to at least one recipient or for publishing it to a blog or chat-room server. Additional compensation may be awarded to the sender if the recipient who receives the advertisement interacts with it. The sender may also receive additional compensation if the recipient purchases a good or service from the advertiser after interacting with the interactive advertisement. It should be appreciated that compensation including, but not limited to, money, products, services, software, information, points that are redeemable for goods or services, and other forms of compensation generally known to those skilled in the art are within the scope and spirit of this invention.

Figure 9:
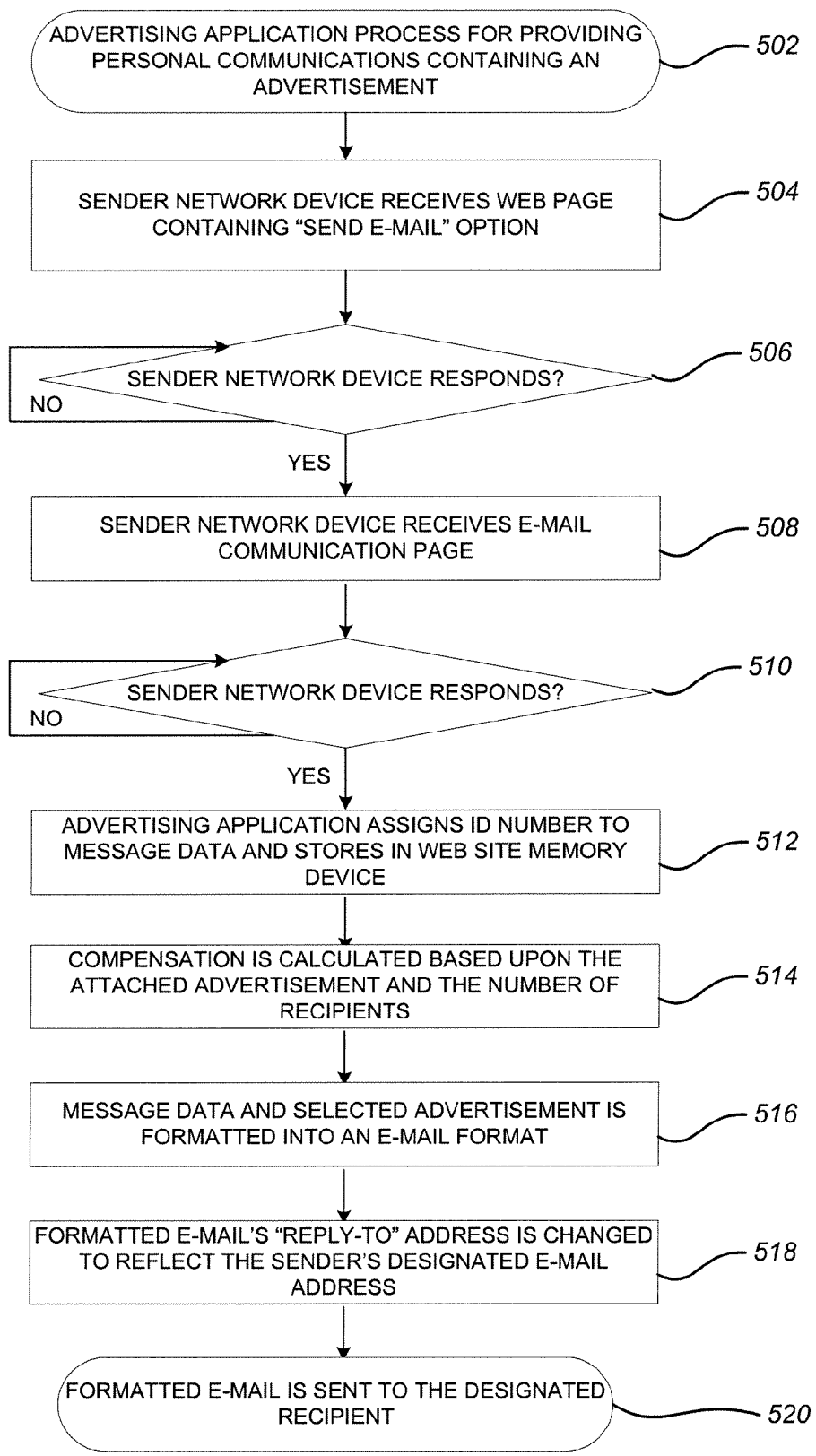
FIG. 9 is a flow diagram illustrating how an advertising application generates and transmits an e-mail containing a sender-selected advertisement.

FIG. 9 outlines, beginning at step 502, the process the advertising application goes through to provide the recipient network device with a digital message containing an advertisement. At step 504, the advertising application provides a Web page containing a "send e-mail" option to the sender network device. The advertising application, at step 506, receives a response from the sender network device indicating that an e-mail should be sent. At step 508, the advertising application provides the sender network device with an e-mail communication page (see FIG. 8), enabling the sender to enter at least one designated recipient, the subject matter, the content, any attachments, and a selected advertisement that should accompany the completed e-mail. The end result is a compilation of data that includes sender data, advertisement data, and message data. The advertising application, at step 510, receives a response from the sender network device indicating that a compilation of data is being submitted. At step 512, the advertising application receives the compilation of data, which includes message data, sender data, and advertisement data, and assigns a unique identification number to the message data. The compiled data is then stored in the Web site memory device. The unique identification number, as assigned to the message data, and as previously assigned to the sender data (upon registration of the sender) and the advertisement data (upon submission of the advertisement), enables the advertising application to easily search for individual entries and link individual entries with other individual entries. The advertising application then determines the compensation that is due the sender, at step 514, based upon the selected advertisement and the number of recipients that will receive the selected advertisement. At step 516, the message data (which includes the selected advertisement) is formatted into a standard e-mail format. The formatted e-mail's reply-to address is changed, at step 518, to reflect the sender's e-mail address that was provided by the sender upon registration. At step 520, the formatted e-mail is sent to the designated recipient(s).

Referring back to FIG. 2, assuming the designated recipient is the recipient network device 130, the formatted e-mail is routed from the Web site 110 to the recipient e-mail server 210, where the e-mail is re-formatted so that it can be read by the recipient network device 130. For example, if the recipient network device is a mobile phone, the e-mail service provider for that mobile phone is set up to re-format incoming e-mails so they are properly displayed on the mobile phone's display. In another embodiment of this invention, the Web site 110 further includes a system and method for receiving and transmitting e-mails to network devices, regardless of the type of network device that is being used. The e-mail server will utilize a POP3, IMAP, or other standard e-mail protocol to receive and store e-mails. Additionally, the same platform independent architecture used in transmitting additional communication data to network devices (as discussed below) will be used in connection with the e-mail server, thus allowing e-mails to be transmitted to a variety of network devices, regardless of the different e-mail format requirements. Regardless of which e-mail server is used, the re-formatted e-mail (which contains the sender-selected advertisement) is forwarded on to the communication application 134 operating on the recipient network device 130.

If the advertisement contained in the e-mail is static, it can be displayed or performed on the recipient display 132 (which may require speakers for performance of audio advertisements). However, if the advertisement is interactive, and the advertisement is interacted with, additional communication data will be provided to the recipient network device 130. The location of the additional communication data (or a pointer to the data) is contained in a URL (or Uniform Resource Locator) embedded within the interactive advertisement. A URL contains a unique address which fully specifies the location of data on the Internet. Unlike most advertisement URLs that provide data directly from the advertiser's Web site, the URL embedded within the sender-selected advertisement provides the recipient network device 130 with data from the Web site 110, and more particularly from the Web site memory device 116. This data stored on the Web site memory device 116 may itself be the additional communication data that is to be provided to the recipient network device 130 or it may contain the address of such data. Regardless, the additional communication data will be provided to the recipient network device 130 by the advertising application 114 operating on the Web site 110 using the procedures outlined in FIG. 4.

Figure 10:
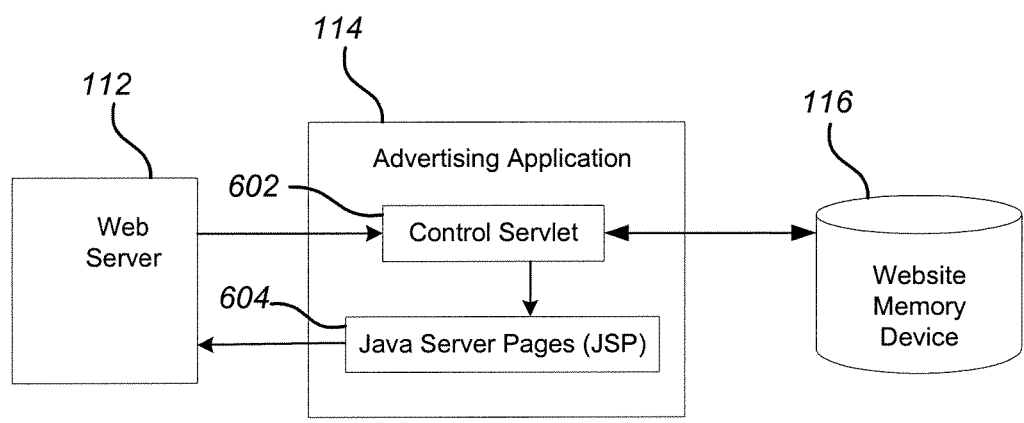
FIG. 10 is a diagram illustrating the primary components responsible for the device and data neutral functionality of the system illustrated in FIG. 1, specifically the separation of data processing and data output within an advertising application.

One embodiment of the advertising application using the Java programming language is shown in FIG. 10. Here, the advertising application 114 further contains two sub-applications, referred to as a control servlet 602 and a JSP (Java Server Page) 604. It should be noted that the phrase "control servlet" is used here in its generic sense, actually referring to one of many specific servlets operating on the advertising application 114. Additionally, the JSP sub-application 604, as used here, is actually referring to one of a plurality JSPs, where each JSP is responsible for performing a specific function for a specific type of network device. When a recipient interacts with an interactive advertisement, the request data (contained in the URL) refers to the control servlet 602. The control servlet 602 uses the request data to retrieve data from the Web site memory device 116, and provide an output portion of that data to the JSP 604. The output data is then placed within the JSP 604 template that has been optimized for the targeted, recipient network device 130.

Figure 11:
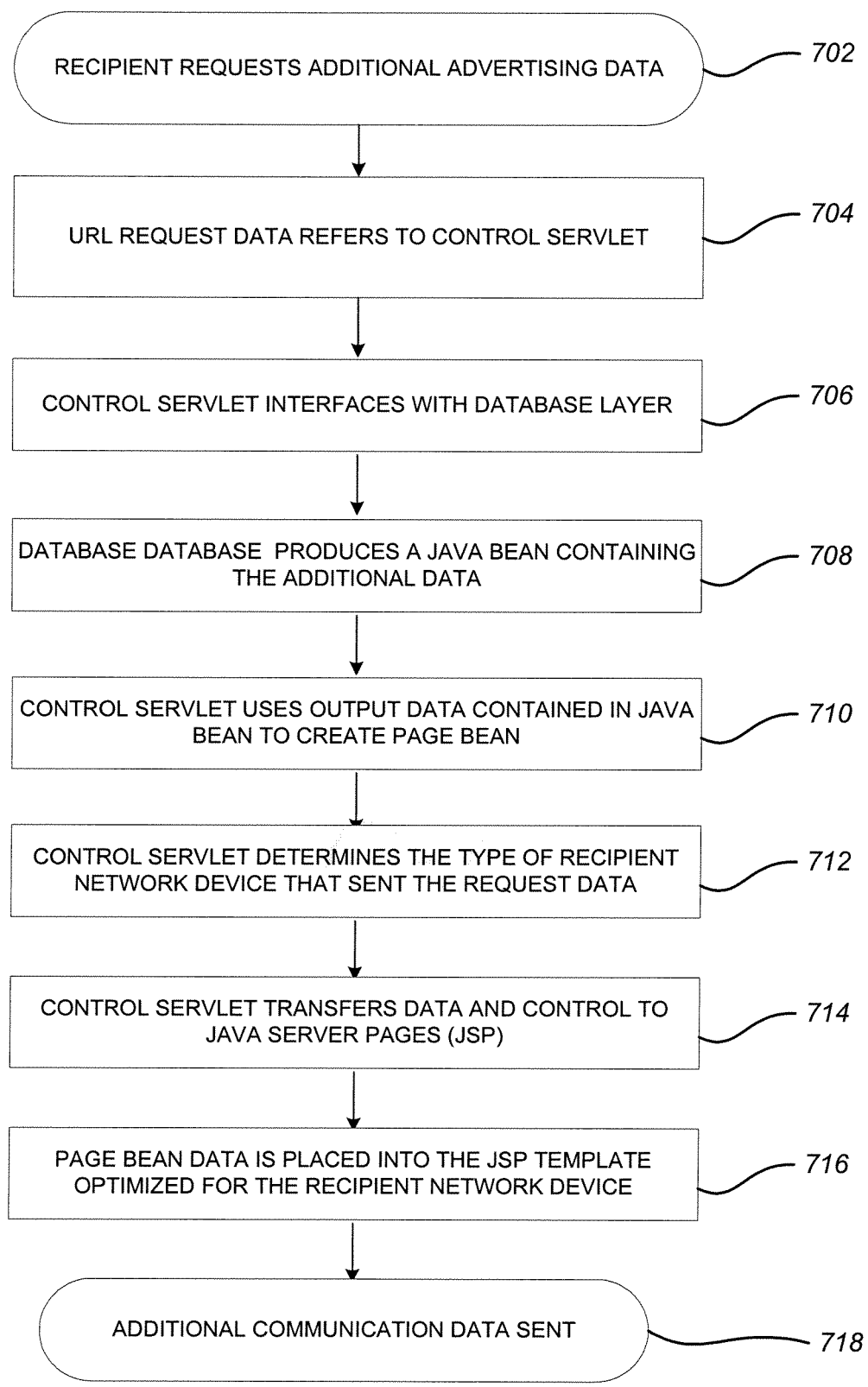
FIG. 11 is a flow diagram illustrating one method of providing additional communication data to a recipient.

The flow diagram in FIG. 11 outlines what happens when a recipient interacts with an interactive advertisement 702. When an interactive advertisement is interacted with, as in step 704, request data (contained in the URL) is directed to the control servlet. At step 706, the control servlet calls for additional data, based upon unique identification numbers (e.g., memory ID, sender ID, advertisement ID) contained in the request data, from a database software layer, which has access to the Web site memory device. At step 708, the database software layer provides the additional data to the control servlet in at least one populated Java Bean. The control servlet, at step 710, uses the output data contained in the Java Bean to produce a Page Bean. At step 712, the control servlet determines the type of recipient network device that made the request. This information is embedded within the HTTP protocol (HyperText Transport Protocol), which is the standard client-server protocol used on the World Wide Web, and thus used to send the URL request data from the recipient network device to the control servlet. The control servlet then directs the Page Bean, data identifying the type of recipient network device, and control to the JSP at step 714. At step 716, the data contained within the Page Bean is placed into the JSP template optimized for the recipient network device. The populated JSP template (i.e., template containing additional communication data) is then sent to the recipient network device at step 718. This platform independent architecture not only allows additional communication data to be transmitted to an interacting recipient, it allows data to be provided to a variety of network devices, regardless of the request. The output from the Web site 110 is capable of providing data to a variety of sender network devices and recipient network devices, regardless of whether that data is additional communication data, Web page data, audio data, video data, image data, or e-mail data.

Referring back to FIG. 1, the advertiser network device 140 is connected to, and can communicate through the Internet 102. This enables an advertiser to communicate with the Web site 110. To do this, the advertiser is given a user account, which includes a user name and password, which allows the advertiser to log on to the Web site 110. Once the advertiser is logged on, the advertiser can use the advertiser network device 140 to upload an advertisement to the Web site 110. To do this, the advertising application 114 provides the advertiser network device 140 with a list of category headings, requesting that the advertiser register the advertisement under at least one of these headings. Once a heading is selected, the advertiser can provide the advertisement to the advertising application 114. If the advertisement is a textual message, the advertising application 114 allows the advertiser the option of inputting the textual information that makes up the advertisement. Alternatively, the advertiser can upload the advertisement data (e.g., text, icon, graphic, audio). If the advertiser selects to upload data, that data should be provided in an acceptable format. For example, icon or graphic data could be provided in JPEG, GIF, or any other generally recognizable graphical format. Audio data could be provided in WAV, MP3, or any other generally recognizable audio format.

The advertiser should at this time specify whether the advertisement is static or interactive. If it is interactive, the additional communication data provided upon interaction, or the location of such data, should be provided so that the additional communication data can be provided to any recipient interacting with the interactive advertisement. The advertiser should then provide information regarding the compensation that is to be paid to senders who include the advertisement within their personal communication. This information may include, but is not limited to, a date and time when the advertisement should be made available, an expiration date, a maximum number of available transmissions, a maximum length of time it may be displayed on a bulletin board server, the compensation that is to be paid for each transmission or posting, the compensation that is to be paid each time a recipient interacts with the advertisement, and the compensation that is to be paid each time a recipient purchases a good or service after interaction.

Additionally, once the advertiser is logged on to the Web site 110, the advertiser can use the advertiser network device 140 to gather statistical data from the Web site memory device 116. This statistical data may include, but is not limited to, the number of times an advertisement has been sent, the number of times an advertisement was interacted with, the number (and currency amount) of purchases made after an advertisement was interacted with, the profile of senders who are sending an advertisement, and the compensation that is due for an advertisement's transmission, interaction, or purchases made thereafter.

As well, the staff network device 150 is also connected to, and communicates through the Internet 102. This enables a Web site staff member to communicate with the Web site 110. To do this, the staff member is given a user account, which includes a user name and password, allowing the staff member to log on to the Web site 110. Once the staff member is logged on, the staff member can access Web pages and acquire information in order to maintain the Web site and derive system intelligence. The Web site maintenance includes, but is not limited to, creating, updating, and removing advertiser and sender accounts, updating sender profiles, administering advertisement campaigns, suspending different service areas, and enabling different service areas. The reporting of system intelligence includes, but is not limited to, usage statistics (e.g., CPU load, number of e-mails sent, number of users), status of advertising campaigns, and revenue streams.

In an effort to prevent fraud, the advertising application is adapted to run a variety of antifraud programs. Such programs may include, but are not limited to, sending a user name and password to a sender's designated e-mail account, allowing only one account to be linked to a single mailing address, and denying compensation to a sender if the sender attempts to send an advertisement more than a pre-determined number of times, send more than a pre-determined number of advertisements within a pre-determined amount of time, send an advertisement to a single recipient more than a pre-determined number of times, or send more than a pre-determined number of advertisements to a single recipient within a pre-determined amount of time. It should be appreciated that other fraud and spamming prevention programs generally known to those in the art are within the scope and spirit of this invention.

The advertising application is also applicable to a system in which a mobile client is provided to a mobile sender device, enabling the mobile sender device to send a personal communication containing a sender-selected advertisement to a recipient. Traditional mobile (wireless) devices, due to their small screen size, small memory capacity, and slower data transmission rate, typically require additional software to interface effectively with the Internet. It should be appreciated that the mobile client could be constructed using Java, SIM Toolkit, or any modern platform generally known to those skilled in the art. In an embodiment of the invention, the mobile client is constructed using the Java platform.

Figure 12:
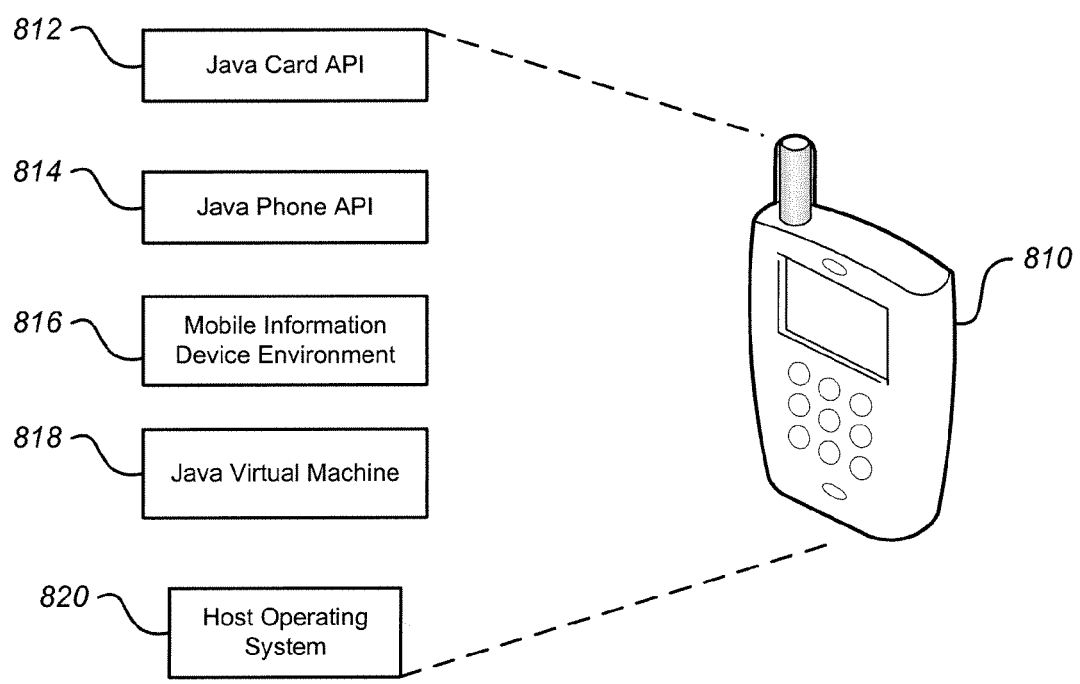
FIG. 12 is a diagram illustrating various software levels operating on a wireless Internet device.

FIG. 12 shows a mobile sender device 810 containing a variety of applications constructed using the Personal Java Platform. It should be appreciated that mobile sender devices include, but are not limited to, wireless application protocol (WAP) mobile phones, I-Mode mobile phones, 3G devices, wireless entertainment devices (WED), wireless information devices (WID), and other wireless network devices generally known to those skilled in the art. The mobile sender device 810 contains a factory provided Host Operating System 820, as depicted in FIG. 12. Additionally, the mobile sender device 810 utilizes a variety of software components that operate on top of the Host Operating System 812, in which the software components are either pre-installed or downloaded by the user of the mobile sender device 810. These software components include a Java Virtual Machine 818, a Mobile Information Device Environment 816, a Java Phone API 814 (Application Programming Interfaces), and a Java Card API 812. The Java Virtual Machine 818 makes the mobile sender device 810 platform independent, thus allowing a single mobile client to be utilized on any mobile sender device. The Mobile Information Device Environment 816 provides a set of tools and APIs that allow applications and user interfaces to interact with the mobile sender device 810. The Java Phone API 814 is utilized to provide access to the generic functions of the mobile sender device 810, whereas the Java Card API 812 is utilized to provide access to the Java Virtual Machine 818 and the capability to store transactions and information.

Figure 13:
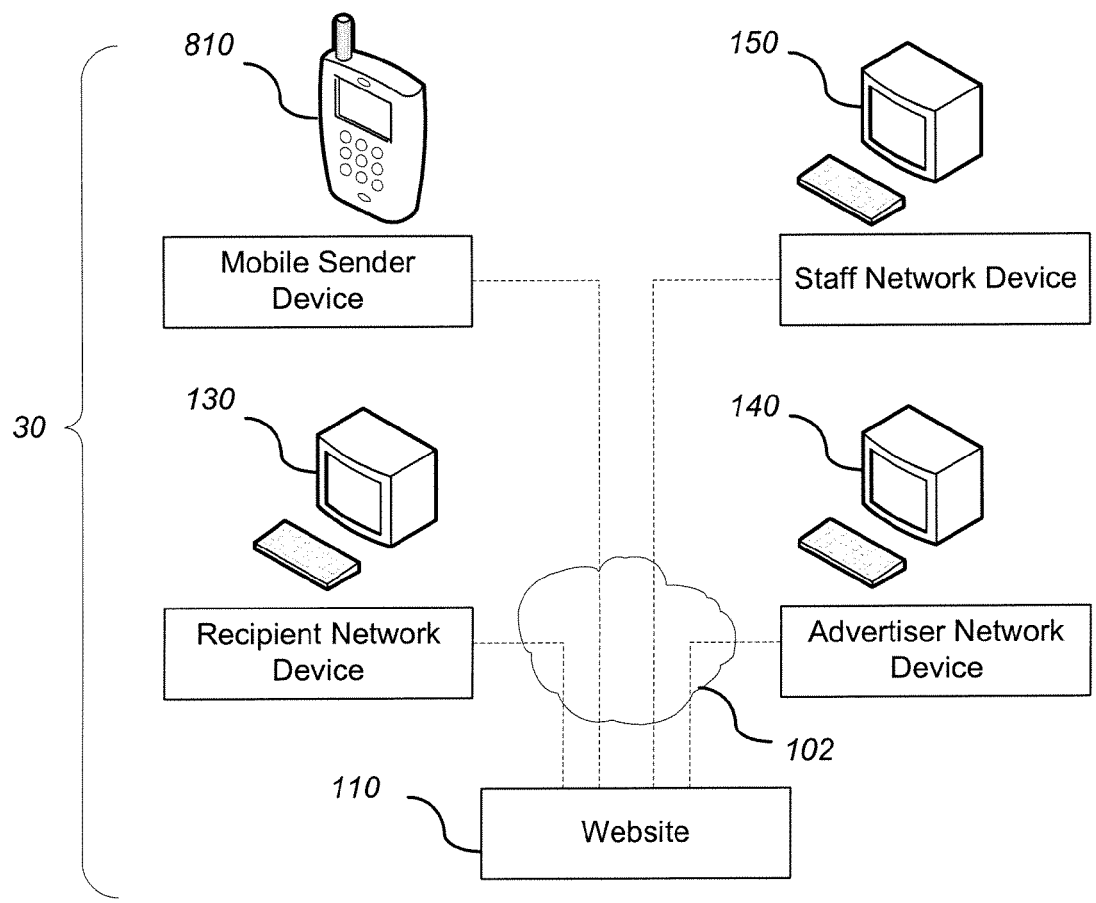
FIG. 13 is a high level architectural diagram illustrating a system that operates in accordance with one embodiment of the present invention to use an e-mail client operating on a mobile Internet device together with an application program operating on a Web site to provide a personal communication containing an advertisement to a recipient via the Internet.

FIG. 13 depicts an exemplary e-mail client advertising system 30 that operates in accordance with one embodiment of the invention. In this embodiment, the mobile client is an e-mail client that works together with the advertising application 114 (see FIG. 2) to route an e-mail containing an advertisement to a recipient network device 130. The mobile sender device 810 is connected to, and communicates through, the Internet 102. This allows the mobile sender device 810 to communicate with the Web site 110, and more specifically with the advertising application 114 (see FIG. 2). The e-mail client allows the sender to provide the mobile sender device 810, containing the various software components depicted in FIG. 12, with message data and selected advertisement data. After the message data and selected advertisement data is compiled, and the sender has indicated that the compiled data should be sent, the compiled data (which may include message data, advertisement data, and sender data) is transmitted to the Web site 110. The advertising application 114 (see FIG. 2) stores the compiled data in the Web site memory device 116 and determines the amount of compensation that is due the sender. As previously mentioned, if the recipient network device 130 interacts with an interactive advertisement contained within the e-mail, the recipient network device 130 will be provided with additional communication data pertaining to the request data contained in the URL that is embedded within the interactive advertisement.

Figure 14:
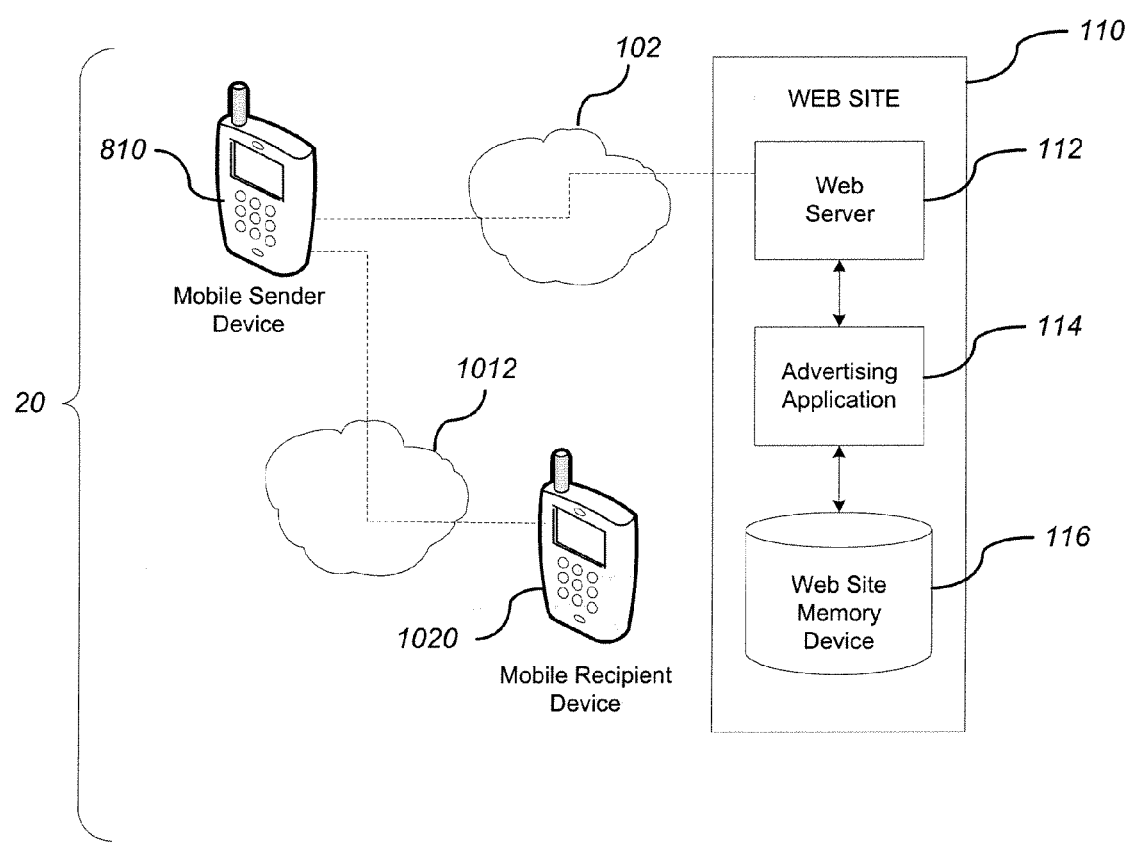
FIG. 14 is a high level architectural diagram illustrating a system that operates in accordance with one embodiment of the present invention to send a personal communication containing an advertisement to a recipient over a wireless network.

FIG. 14 depicts an exemplary client advertising system 20 that operates in accordance with one embodiment of the invention. In this embodiment, the mobile client enables a mobile sender device containing the software component depicted in FIG. 12 to transmit a personal communication containing an advertisement to a mobile recipient device via a wireless network infrastructure. The mobile sender device 810 is connected to and can communicate through the Internet 102. This allows the mobile sender device to communicate with the Web site 110, through the Web server 112. Additionally, the mobile sender device 810 can connect to and communicate through a wireless network infrastructure 1012. This allows the mobile sender device to transmit a personal communication directly to a mobile recipient device 1020, without the entire communication first being routed through the Internet. It should be appreciated that in this embodiment, the personal communications includes communications sent using a short message service (SMS), a multimedia messaging service (MMS) or any other wireless message sending format generally known to those skilled in the art.

The client will allow the sender to provide the mobile sender device 810 with message data and selected advertisement data. After the message data and selected advertisement data is compiled, and the sender has indicated that the compiled data should be sent, the client will instruct the mobile sender device 810 to route the personal communication, together with the selected advertisement, to the mobile recipient device 1020 via the wireless network infrastructure 1012. At approximately the same time, the client will instruct the mobile sender device 810 to upload the message data, advertisement data, and sender data to the advertising application 114 operating on the Web site 110. The advertising application 114 then stores the data in the Web site memory device 116 and determines the compensation that is due the sender. If the mobile recipient device 1020 interacts with an interactive advertisement contained within the personal communication (e.g., SMS), the mobile recipient device 1020 will be provided with additional communication data pertaining to the request data contained in the URL that is embedded within the interactive advertisement.

Figure 15:
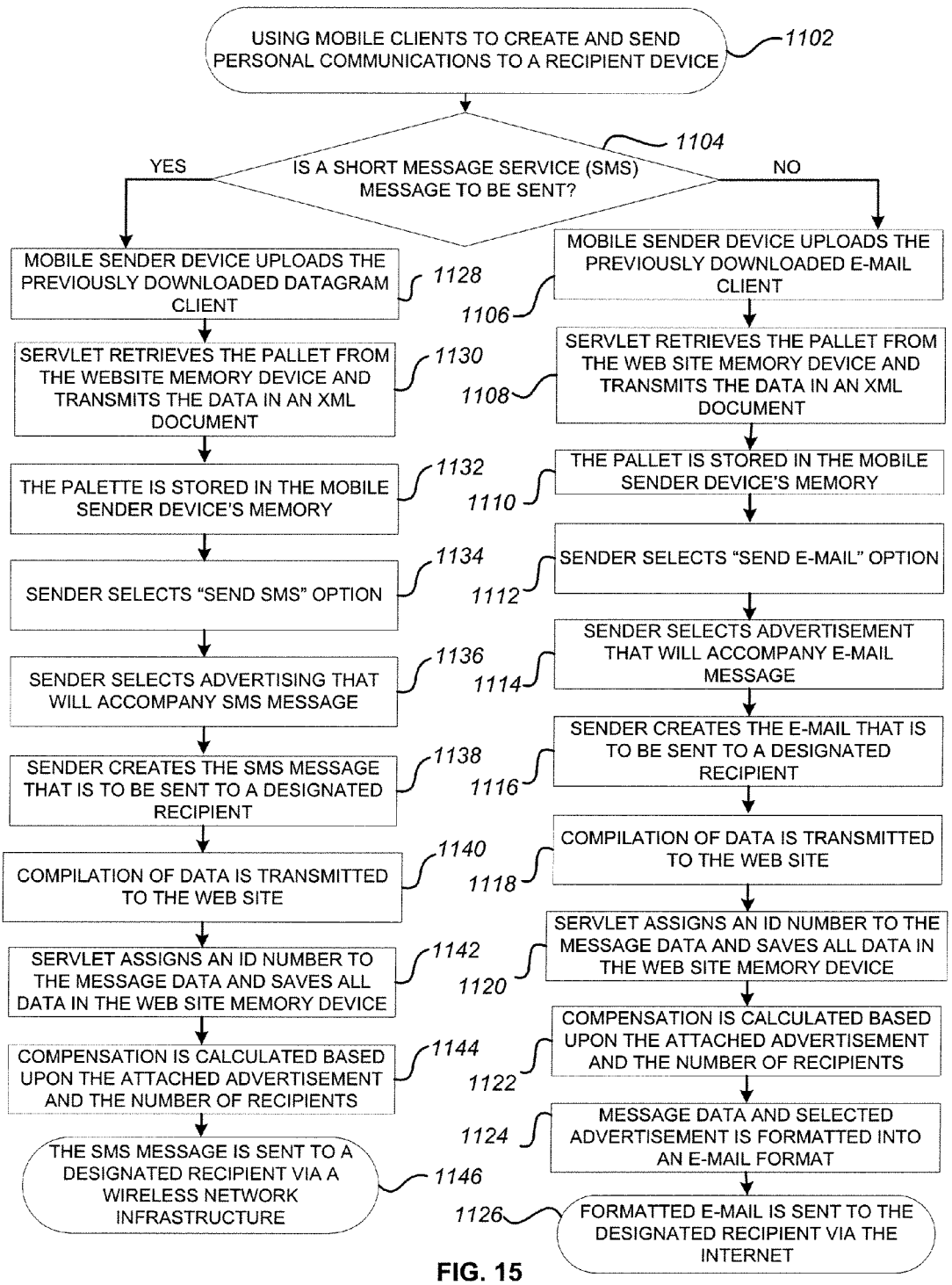
FIG. 15 is a flow diagram illustrating how a mobile client operating on an mobile sender device is used together with an application program operating on a Web site to provide a personal communication containing an advertisement to a recipient.

A flow diagram in FIG. 15, beginning at step 1102, outlines an exemplary process of routing an SMS or e-mail message containing an advertisement to a recipient device when a sending device utilizes a mobile client to generate and send the personal communication. At step 1104, it should be determined whether the personal communication will be a SMS message that will be routed via a wireless network infrastructure, or an e-mail message that will be routed via the Internet.

If an SMS message is to be sent to a mobile recipient device, at step 1128, the mobile sender device uploads the previously downloaded client. This prompts a control servlet, at step 1130, operating on the Web site, to retrieve the sender's palette of advertisements from the Web site memory device and transmit the palette in an XML document to the mobile sender device. At step 1132, the palette is received and stored in the mobile sender device's memory. The sender then selects, at step 1134, the "send SMS" feature provided by the client, which allows an SMS message to be created. At step 1136, the sender selects an advertisement from the palette that will accompany the SMS message. The sender then provides the client with message data, at step 1138, which may include recipient data, subject data, and content data. A compilation of data is then transmitted to a control servlet operating on the Web site, at step 1140, which includes message data, sender data, and advertisement data. Another control servlet assigns an ID number to the message data (as previously assigned to the sender data and the advertisement data), at step 1142, and stores all compiled data in the Web site memory device. At step 1144, the advertising application determines the amount of compensation that is due the sender based upon the selected advertisement and the number of recipients that received the advertisement. The SMS message, along with the selected advertisement, is sent by the mobile sender device, at step 1146, to the designated mobile recipient device over a wireless network infrastructure.

In an alternative embodiment, the mobile sender device routes the SMS message and the selected advertisement over a wireless network infrastructure, where the cost of the transmission is billed to an account provided by the Web site. The compensation (or part thereof) normally sent to the sender is kept by the Web site to subsidize the cost of the wireless transmission.

At step 1104, if the sender determines that an e-mail message is to be sent via the Internet, the mobile sender device should upload, at step 1106, the previously downloaded e-mail client. This prompts a control servlet, at step 1108, operating on the Web site, to retrieve the sender's palette of advertisements from the Web site memory device and transmit the palette in an XML document to the mobile sender device. At step 1110, the palette is received and stored in the mobile sender device's memory. The sender then selects, at step 1112, the "send e-mail" feature provided by the e-mail client, which allows an e-mail message to be created. At step 1114, the sender selects an advertisement from the palette that will accompany the e-mail message. The sender then provides the e-mail client with message data, at step 1116, which may include recipient data, subject data, and content data. A compilation of data is then transmitted to a control servlet operating on the Web site, at step 1118, which includes message data, sender data, and advertisement data. Another control servlet assigns an ID number to the message data (as previously assigned to the sender data and advertisement data), at step 1120, and stores all compiled data in the Web site memory device. At step 1122, the advertising application determines the amount of compensation that is due the sender based upon the selected advertisement and the number of recipients that received the advertisement. The e-mail message, along with the selected advertisement, is then formatted, at step 1124, into an e-mail format. At step 1126, the formatted e-mail message is sent by the advertising application to the designated recipient network device over the Internet.

In another embodiment of the invention, the additional communication data is sent to the recipient network device 130 so that a first portion of the additional communication data can be displayed on the recipient display 132 as soon as the first portion is received by the recipient network device 130. A remaining portion of the additional communication data, which is received after the first portion, does not effect the displaying of the first portion on the recipient network device 130. As well, subsequent portions of the additional communication data, which together make up the remaining portion, can be displayed on the recipient display 132 as soon as each portion is received by the recipient network device 130. If the recipient network device 130 does not support such a function, a display client can be provided by the Web site 110 in a downloadable format. The display client would enable the recipient network device 130 to display a first portion of additional communication data as it is received, which would be beneficial for devices with small screens, small memory capabilities, or slow data transmitting rates.

Figure 16:
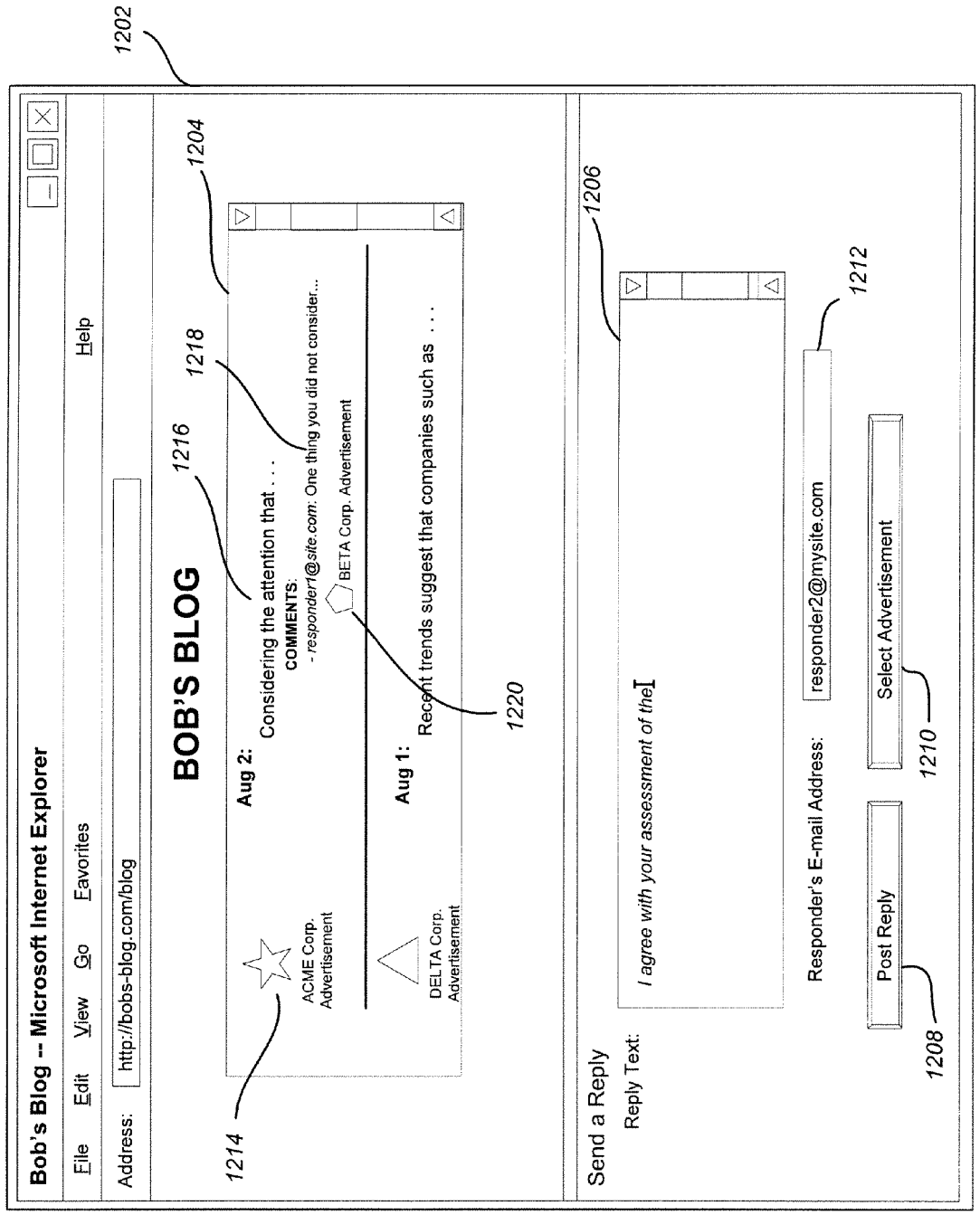
FIG. 16 is a diagram illustrating an exemplary blog Web site in which a blog author selects an advertisement to be displayed alongside contributed comments, and readers may select an advertisement to be displayed with their posted responses.

FIG. 16 depicts an exemplary blog Web site 1202 in accordance with an embodiment of the invention in which a blog author interacts with an advertising application to associate an advertisement with contributed content posted on the Web server. The Web site 1202 is depicted as it would appear to a reader of the blog. Entries contributed by the author of the blog appear in display area 1204 organized in reverse chronological order. When the blog author submits contributions 1216 for publication on the Web site, he may select an advertisement 1214 to appear in close proximity to the contributed digital message 1216. These advertisements may be static, or they may be interactive, allowing the reader to request more information by, for example, clicking on text or graphics appearing in the advertisement. The author is compensated for selecting and including an advertisement along with a digital message. For example, the author may receive free blog hosting services in exchange for associating an advertisement with comments. Readers of the blog are given the opportunity to post comments in reply to the contents of the blog. By filling in a reply form 120 and providing an identifying e-mail address 1212, a reader may submit a comment to be posted on the Web site. Before submitting the comment by selecting the "post reply" button 1208, the user may elect to include an advertisement with the response using the "select advertisement" button 1210. When the reader does so, the selected advertisement 1220 will appear on the Web site along with the submitted comment 1218. An advertising application running on the server will keep track of advertisements selected and displayed by authors and readers of the blog and calculate compensation accordingly. For example, readers selecting and displaying an advertisement may receive a larger quota of published comments, or may have their comments presented more prominently in exchange for including an advertisement.

Figure 17:
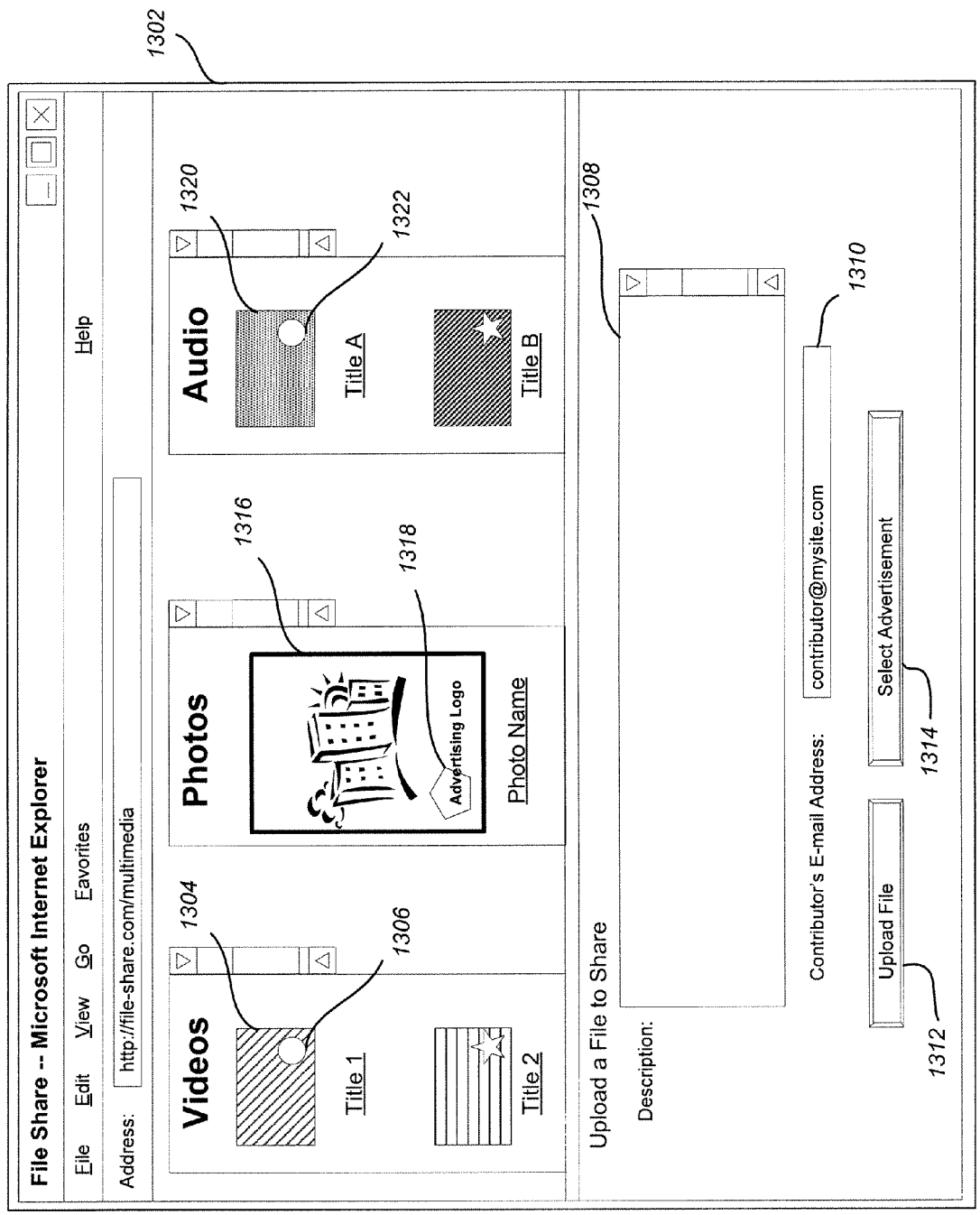
FIG. 17 is a diagram illustrating an exemplary data-sharing Web site at which users may post multimedia content, including audio, video, and image files, containing embedded advertisements, to share with other users.

FIG. 17 is a diagram illustrating an exemplary multimedia data-sharing Web site 1302, where users may post multimedia content, including audio, video, and image files, which may contain embedded advertisements, to share with other users. Such Web sites may contain a variety of media formats as depicted in FIG. 14, or they may include files of only one type. In general, users of the site wishing to download or stream multimedia content will need to register with the network server and enter login information before being allowed to access content. Thus, the network server will generally have user profile information available about the user accessing a particular file. Multimedia files 1304 are presented to the user for download or streaming. Users may scroll through the available submissions, or may search for particular content. When a user selects a file to download or stream, the advertising application selects an advertisement based upon selections made by the contributor of the file in combination with the saved profile data of the user downloading the advertisement and associates the advertisement with the selected file. Advertisements are indicated schematically at 1306. In a video file, a video advertisement is appended to the beginning of the contributed video such that a user selecting that video for viewing will first view the embedded advertisement. In the case of an image file or photograph 1316, the advertisement 1318 selected by the contributor is displayed adjacent to or superimposed upon the image file or photograph such that a user viewing the image will also view the advertisement. For audio files 1320, contributors are allowed to select audio advertisements 1322 to be associated with their contributions such that a user accessing the audio content will first hear the advertisement and then the audio content. Contributors are invited to share their own multimedia content by providing a description in a form box 1308, providing an identifying e-mail address 1310, and uploading a digital file to the Web site using the upload function 1312. Contributors may also elect to embed an advertisement in the uploaded content using the "select advertisement" function 1314. In some cases, users will select a particular advertisement that is always associated with the uploaded content. In other cases, a user will select a number of advertisements, any one of which may be associated with the uploaded content at the point of download by a user. In the latter case, the advertising application will use user profile data associated with the logged-in user in order to select an advertisement, from among those selected by the contributor, that is best aligned with the user's profile. Contributors selecting and including an advertisement or set of advertisements are compensated, for example, with increased storage space or an increased quota of items for upload.

Figure 18:
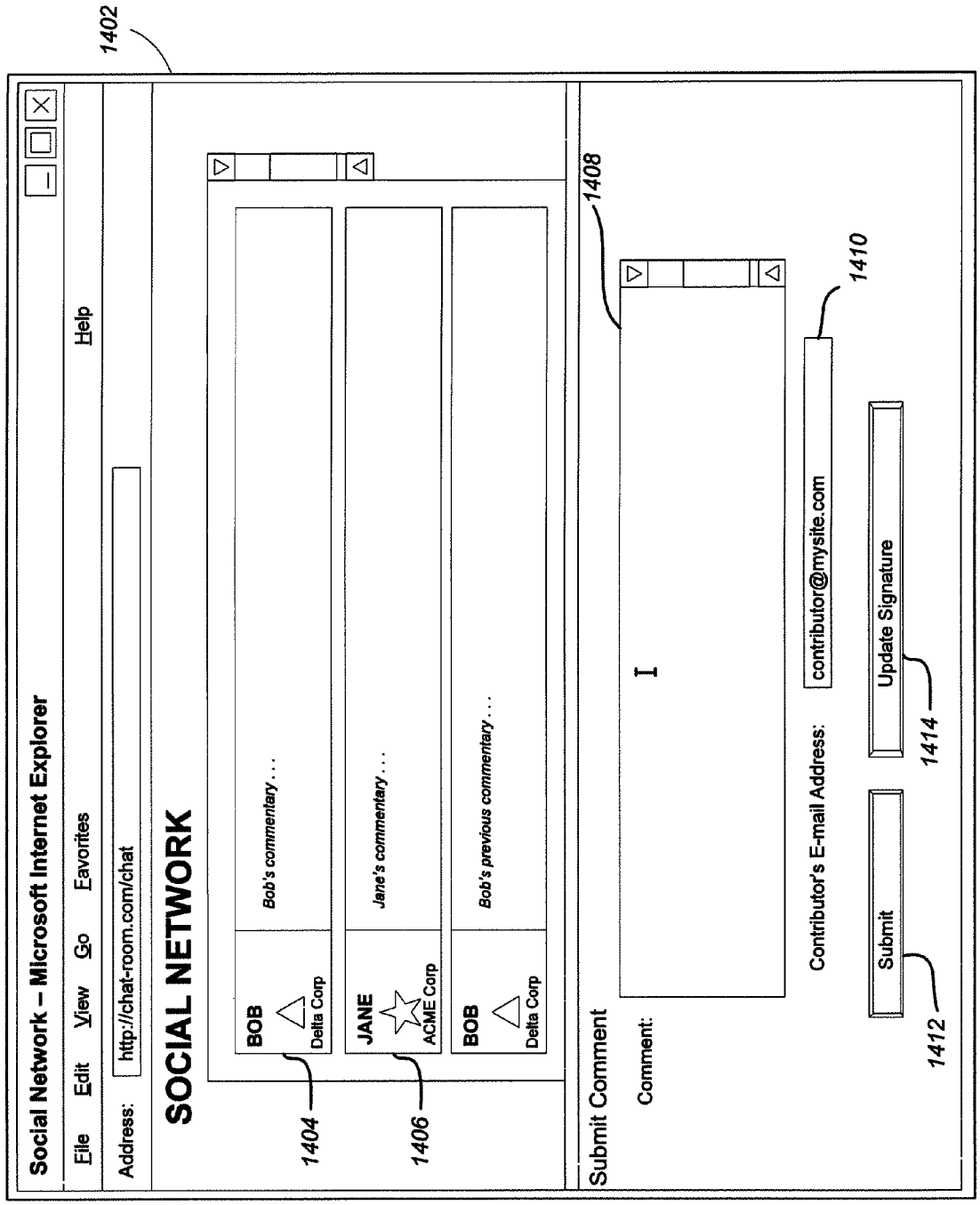
FIG. 18 is a diagram illustrating an exemplary bulletin-board Web site depicting users who have identified themselves with certain brands or products in their digital signatures.

FIG. 18 illustrates another embodiment of the invention in which users associate an advertisement with their personal signatures in addition to or in lieu of associating an advertisement with a particular digital message. Users interact in an online community or online social network, such as MySpace or Facebook, in which they discuss subjects of common interest. To identify the author of each post, users select certain symbols, images, or text to describe themselves. As one of these identifying symbols, a user may select a brand name or product logo to associate with his or her digital signature as a form of personal endorsement. FIG. 18 illustrates two such users who have selected product symbols as part of their identifying information 1404 and 1406. When a contributor wishes to submit a comment using the form box 1408 and "submit" function 1412, he may first update the signature associated with his account using the "update signature" function 1414. There, the contributor will have the opportunity to change images and text associated with his personal identifying information and will also have the opportunity to select a product logo or brand name if desired. Users selecting an advertisement as part of their signatures, or to be posted automatically with their signatures, will receive compensation for including the advertisement by receiving services such as increased allocations for posted comments, more prominent display of their comments through the use of larger fonts or different colors, or other forms of compensation.

Figure 19:
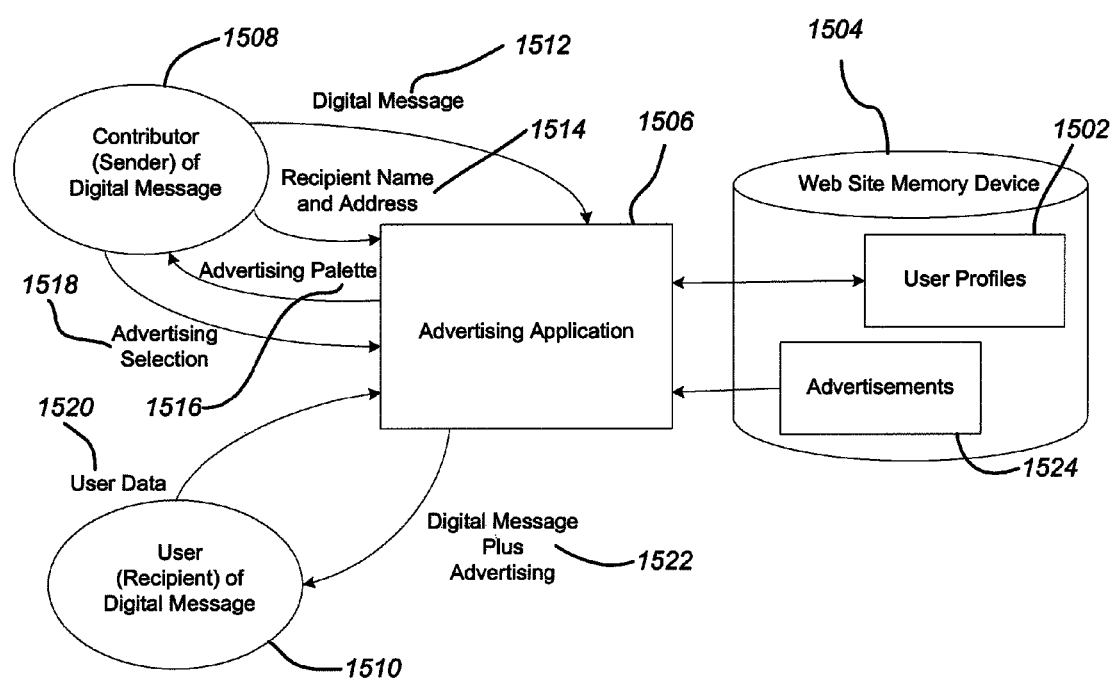
FIG. 19 is a data flow diagram depicting a contributor of digital content and a user of that content interacting with an advertising application hosted on a Web site.

FIG. 19 illustrates an exemplary flow of data between a contributor of a digital message, a user of a digital message, and the advertising application, according to another embodiment of the present invention. The contributor 1508 of a digital message 1512 sends the message data to the advertising application 1506 running on a network server or Web site. The message may be intended for publication on the Web site as a blog entry or as a comment to another online posting, or it may be intended as a personal communication directed to a specific recipient. In the case of a personal message to a specific recipient, the contributor will also send the name and network address of the recipient 1514 to the advertising application 1506. The advertising application will then access previously saved user profile data 1502 corresponding to both the sender 1508 and the recipient 1510, if the recipient is a recognized registered user of the Web site. The user profile data includes information provided by the user at the time of registration as well as information collected by the advertising application whenever the user posts a message to the Web site or searches for particular content on the Web site. Based upon the user profile data and upon the content of the digital message, the advertising application will select a palette of advertisements from the database of advertisements 1524 stored on the Web site memory device 1504 comprising those with the highest contextual relevance. The advertising application will make this advertising palette 1516 available to the contributor of the digital message 1508, and the contributor will make a selection of an advertisement 1518 from the palette presented by the advertising application. The advertising application will then assemble the digital message along with the selected advertisement, and send this combined digital data 1522 to the user 1510.

If the digital message is not directed at a particular recipient but rather is intended to be posted to a blog or other Web site featuring user-contributed content, the contributor will not provide recipient data to the advertising application. Instead, an advertising palette 1516 will be created by the advertising application based on contributor data saved in the user profile 1502 and upon the content of the digital message 1512. The contributor 1508 will be permitted to select multiple advertisements approved for display with his digital message and will designate one as a default. When a user later visits the Web site hosting the digital message, that user will send user data 1520 to the advertising application upon logging in to the Web site. If user data for that user is saved in the user profile memory 1502, the advertising application will use that data to select which of the advertisements, approved by the contributor, will be displayed to that user. Since content displayed on the Web site can be created dynamically by the advertising application, different advertisements can be displayed to different users, which are identified to the advertising application when they log in to the Web site. If no user profile data exists for that user, or if the user is unregistered or visits the site without logging in, the default advertisement selected by the contributor will be displayed. To encourage registration and logging in by users, the Web site will generally provide certain features, such as the ability to post responses, only to logged-in registered users. This method ensures that even in the case of more public communications, such as blog messages, advertisements can be selected based on the characteristics of particular individual users.

Figure 20:
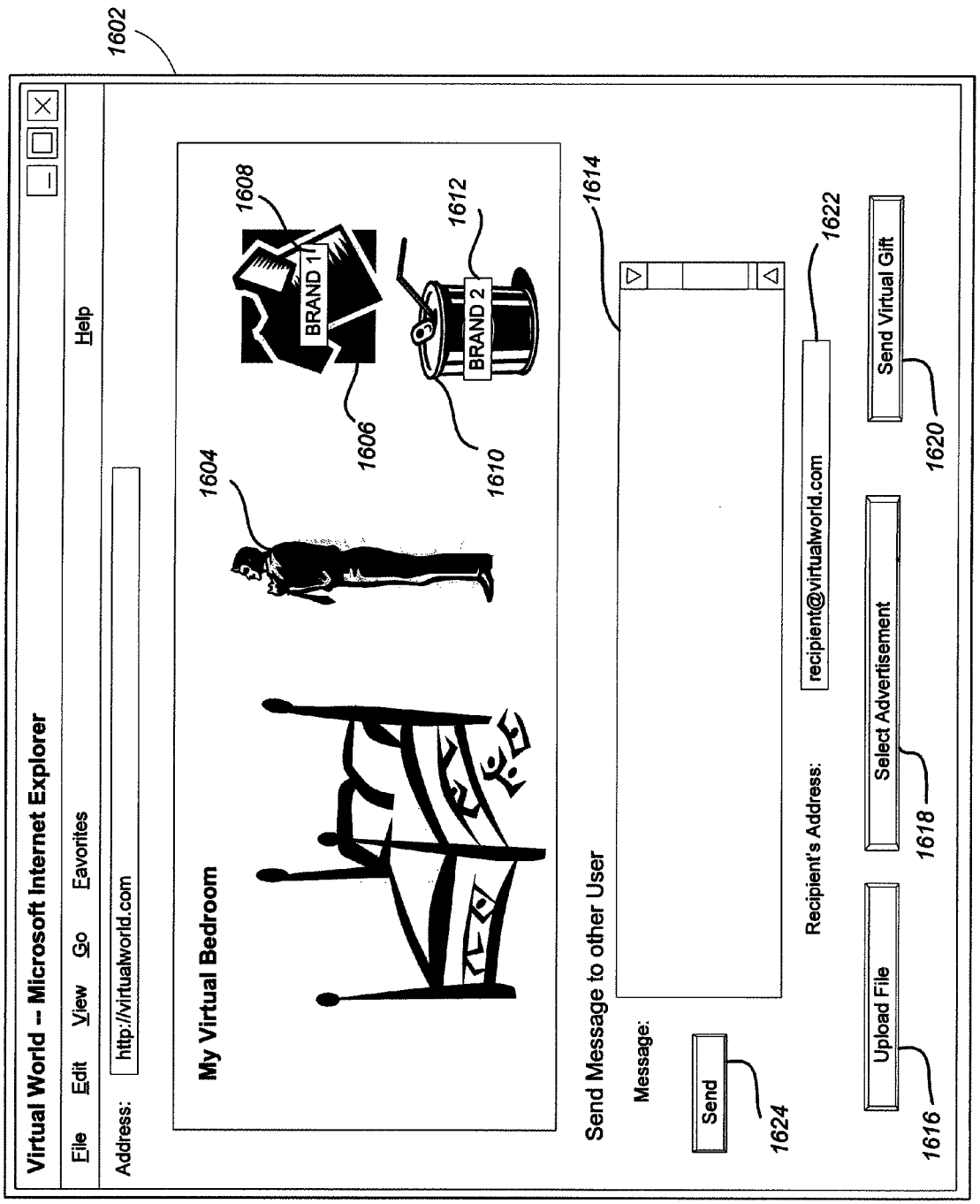

FIG. 20 depicts an embodiment of this invention operating in the context of a virtual world displayed on a Web browser 1602. Here, a user has created a virtual personality, or avatar 1604 and has personalized the avatar's environment with objects and images 1606 and 1610 designed to be viewed by other users of this virtual world. From the objects available to customize and personalize this virtual environment, the user may select an advertisement, an advertising logo, or a brand name to appear in the avatar's environment. For example, FIG. 19 displays a virtual T-shirt 1606 containing an advertising brand name 1608, and a virtual can of soda 1610 marked with a brand name 1612. In addition, advertisements may be inserted into other forms of media, such as audio and video media displayed within the virtual world. In exchange for displaying such an advertisement, the user will receive compensation, which could be in the form of enhanced services, such as an increased selection of decorative objects. Users of this virtual world may also communicate directly with other users, for example, by using a message window 1614 to enter text, a recipient address window 1622 to enter recipient addressing information, and a send button 1624 to send the message. When sending such a message, the sender may elect to include an advertisement with the message by using the "select advertisement" button 1618. A sender selecting an advertisement to include with a personal message will be compensated, perhaps by receiving a free service. Some decorative objects appearing in the virtual world may be rare, for example, the virtual can of soda 1610, and some users will send such items to other users as virtual gifts. In making such a gift, using the "send virtual gift" button 1620, a sender may choose to send a branded item as a gift to another user. Alternatively, the sender may select an advertisement to accompany the virtual gift to the other user. In many such virtual worlds, a user will be required to purchase these virtual gifts he plans to send to other users. In exchange for including an advertisement with his virtual gift, such a user may obtain the virtual gifts free of charge or for a reduced price.

Having thus described a preferred embodiment of a system and method for adding an advertisement to digital messages, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

What is claimed is:

1. A method of selecting advertisements comprising:
building, by a computer, a user profile database by registering a plurality of users and collecting information relating to content of messages contributed by each of the plurality of users each time one of the plurality of users contributes a message;
receiving a digital message from a user and storing the digital message in a memory device;
parsing, by the computer, the digital message from the user to identify a content and subject matter of the digital message;
selecting, by the computer, from among a database of advertisements stored in the memory device a palette of advertisements that are based on the content and subject matter of the digital message, information stored in the user profile database, or historical data about advertisements previously selected by the user;
receiving a selection of an advertisement from the palette of advertisements; and
displaying the selected advertisement to at least one recipient.

2. The method of claim 1, further including the step of compensating the user contributing the digital message.

3. The method of claim 2, wherein the step of compensating the user comprises providing at least one of a free service, a discounted service, a cash payment, a payment of points redeemable for services, a payment of points redeemable for goods, a free software application, a discounted software application, a discounted hardware device, a free telecommunication service, a discounted telecommunication service, free access to video content, discounted access to video content, free access to audio content, and discounted access to audio content.

4. The method of claim 1, wherein the step of receiving the selection of an advertisement includes receiving a selection from the user contributing the digital message.

5. The method of claim 1, wherein the step of building a user profile database includes collecting geographical location information.

6. The method of claim 1, wherein the step of building a user profile database includes collecting demographic information.

7. The method of claim 1, wherein the step of displaying the selected advertisement includes presenting a graphical image on a web site.

8. The method of claim 1, wherein the step of displaying the selected advertisement includes playing a video or audio presentation.

9. The method of claim 1, wherein the step of displaying the selected advertisement includes sending information to a mobile telephone device.

10. The method of claim 1, wherein the step of displaying the selected advertisement includes sending information to at least one of a personal computer, television set-top box, telephone, consumer appliance, personal digital assistant, or game console.

11. The method of claim 1, wherein the step of displaying the selected advertisement includes sending an e-mail communication.

12. The method of claim 1, wherein the step of displaying the selected advertisement includes posting information to a blog.

13. The method of claim 1, wherein the step of displaying the selected advertisement includes posting information on a social network.

14. An apparatus for selecting advertisements comprising:
a computer system operatively connected to a network and including a memory device, wherein the memory device is adapted to:
store a plurality of advertisements;
store information relating to a user profile database; and
store machine-readable instructions adapted to:
receive messages from a plurality of users;
build the user profile database by collecting and storing information in the memory device relating to content of the messages received from the plurality of users;
parse a digital message received from one of the plurality of users to identify a content and subject matter of the digital message;
select, from among the plurality of advertisements stored in the memory device a palette of advertisements that are based on the content and subject matter of the digital message, information stored in the user profile database, or historical data about messages received from the one of the plurality of users;
receive a selection of an advertisement from the palette of advertisements; and
display the selected advertisement to at least one recipient.

15. The apparatus of claim 14, wherein the machine-readable instructions are further adapted to calculate compensation for the user contributing the digital message.

16. The apparatus of claim 15, wherein the instructions for calculating compensation further comprise arranging for at least one of a free service, a discounted service, a cash payment, a payment of points redeemable for services, a payment of points redeemable for goods, a free software application, a discounted software application, a discounted hardware device, a free telecommunication service, a discounted telecommunication service, free access to video content, discounted access to video content, free access to audio content, and discounted access to audio content.

17. The apparatus of claim 14, wherein the instructions adapted to receive the selection of an advertisement are adapted to receive a selection from the user contributing the digital message.

18. The apparatus of claim 14, wherein the instructions adapted to build a user profile database include instructions for collecting geographical location information.

19. The apparatus of claim 14, wherein the instructions adapted to build a user profile database include instructions for collecting demographic information.

20. The method of claim 14, wherein the instructions adapted to display the selected advertisement include instructions for presenting a graphical image on a web site.

21. The method of claim 14, wherein the instructions adapted to display the selected advertisement include instructions for playing a video or audio presentation.

22. The method of claim 14, wherein the instructions adapted to display the selected advertisement include instructions for sending information to a mobile telephone device.

23. The method of claim 14, wherein the instructions adapted to display the selected advertisement include instructions for sending information to at least one of a personal computer, television set-top box, telephone, consumer appliance, personal digital assistant, or game console.

24. The method of claim 14, wherein the instructions adapted to display the selected advertisement include instructions for sending an e-mail communication.

25. The method of claim 14, wherein the instructions adapted to display the selected advertisement include instructions for posting information to a blog.

26. The method of claim 14, wherein the instructions adapted to display the selected advertisement include instructions for posting information on a social network.

* * * * *

UNITED STATES PATENT AND TRADEMARK OFFICE
CERTIFICATE OF CORRECTION

| | | |
|---|---|---|
| PATENT NO. | : 8,527,345 B2 | Page 1 of 1 |
| APPLICATION NO. | : 11/933061 | |
| DATED | : September 3, 2013 | |
| INVENTOR(S) | : Richard Anthony Rothschild and Robin Star Morton Slomkowski | |

It is certified that error appears in the above-identified patent and that said Letters Patent is hereby corrected as shown below:

Item (76) Inventor Anthony Richard Rothschild's name is indicated incorrectly at present on the title page of the granted patent document. The correct name should be:

Richard Anthony Rothschild

Signed and Sealed this

Thirteenth Day of May, 2014

Michelle K. Lee
*Deputy Director of the United States Patent and Trademark Office*